(12) United States Patent
Zhang et al.

(10) Patent No.: US 12,495,523 B2
(45) Date of Patent: Dec. 9, 2025

(54) ELECTRONIC DEVICE

(71) Applicant: Honor Device Co., Ltd., Shenzhen (CN)

(72) Inventors: Hong Zhang, Shenzhen (CN); Shaohong Dong, Shenzhen (CN); Yandang Qiao, Shenzhen (CN); Fenying Li, Shenzhen (CN)

(73) Assignee: HONOR DEVICE CO., LTD., Shenzhen (CN)

(*) Notice: Subject to any disclaimer, the term of this patent is extended or adjusted under 35 U.S.C. 154(b) by 0 days.

(21) Appl. No.: 18/043,840

(22) PCT Filed: Aug. 19, 2022

(86) PCT No.: PCT/CN2022/113558
§ 371 (c)(1),
(2) Date: Mar. 2, 2023

(87) PCT Pub. No.: WO2023/082750
PCT Pub. Date: May 19, 2023

(65) Prior Publication Data
US 2024/0284636 A1 Aug. 22, 2024

(30) Foreign Application Priority Data

Nov. 10, 2021 (CN) .................... 202111328232.6

(51) Int. Cl.
*H05K 7/20* (2006.01)
*G06F 1/20* (2006.01)
*H05K 9/00* (2006.01)

(52) U.S. Cl.
CPC ......... *H05K 7/20336* (2013.01); *G06F 1/203* (2013.01); *G06F 1/206* (2013.01); *H05K 9/0024* (2013.01); *H05K 9/0026* (2013.01)

(58) Field of Classification Search
CPC ............. H05K 7/20336; H05K 9/0024; H05K 9/0026; H05K 7/20327; H05K 7/2039;
(Continued)

(56) References Cited

U.S. PATENT DOCUMENTS 7,855,891 B1 * 12/2010 Ayres, III .......... H05K 7/20445
174/547
7,965,514 B2 * 6/2011 Hill ..................... H04M 1/0277
361/818
(Continued)

FOREIGN PATENT DOCUMENTS

CN 201429350 Y 3/2010
CN 104902727 A 9/2015
(Continued)

OTHER PUBLICATIONS

Lin Yishen; Liu Mingyue, "Shielding piece, board-level shielding piece, device and method", Jan. 24, 2020, Laird Technologies Inc, Entire Document (Translation of CN 110730605) (Year: 2020).*

*Primary Examiner* — Stephen S Sul
(74) *Attorney, Agent, or Firm* — Slater Matsil, LLP

(57) ABSTRACT

An embodiment of this application provides an electronic device. The electronic device includes at least a mainboard, electronic components, and a shielding assembly. The shielding assembly includes a shielding case, a capillary structure, and a thermally conductive plate. The electronic components are located in the shielding case and connected to the shielding case. The thermally conductive plate is located on a side of the shielding case that faces away from the electronic components. The thermally conductive plate is connected to the shielding case to form a sealing cavity. The capillary structure is disposed in the sealing cavity. The sealing cavity is filled with a working substance. The sealing cavity includes a vaporization zone and a condensation zone. The vaporization zone is located above the electronic (Continued)

components. The capillary structure is configured to enable the working substance to back flow from the condensation zone to the vaporization zone.

20 Claims, 13 Drawing Sheets

(58) Field of Classification Search
CPC ....... H05K 9/0007; G06F 1/203; G06F 1/206; G06F 1/20
See application file for complete search history.

(56) References Cited

U.S. PATENT DOCUMENTS

| | | | |
|---|---|---|---|
| 9,832,859 B2* | 11/2017 | Lee | G06F 1/18 |
| 10,103,087 B2 | 10/2018 | Jin et al. | |
| 10,477,739 B2* | 11/2019 | Dixon | H05K 1/0203 |
| 10,798,849 B2 | 10/2020 | Lee et al. | |
| 11,699,884 B2* | 7/2023 | Braun | H05K 9/0028 361/818 |
| 11,765,860 B2* | 9/2023 | Zhang | G06F 1/1626 361/700 |
| 2004/0211549 A1* | 10/2004 | Garner | F28D 15/046 431/325 |
| 2007/0212821 A1 | 9/2007 | Takahashi | |
| 2009/0040731 A1 | 2/2009 | Jin et al. | |
| 2011/0242764 A1* | 10/2011 | Hill | G06F 1/203 361/705 |
| 2013/0284510 A1* | 10/2013 | Lo | H05K 9/0026 174/377 |
| 2015/0085462 A1* | 3/2015 | Okamoto | H05K 1/0218 361/814 |
| 2015/0282387 A1 | 10/2015 | Yoo et al. | |
| 2015/0364255 A1* | 12/2015 | Ning | H01G 2/22 156/280 |
| 2016/0037684 A1* | 2/2016 | Kim | F28F 1/022 361/700 |
| 2016/0135336 A1 | 5/2016 | Wu | |
| 2016/0192544 A1* | 6/2016 | Aoki | H05K 9/0007 361/752 |
| 2017/0110411 A1 | 4/2017 | Meyer, IV et al. | |
| 2018/0146539 A1 | 5/2018 | Zhang et al. | |
| 2019/0116698 A1 | 4/2019 | Lee | |
| 2019/0141855 A1* | 5/2019 | Inagaki | H01L 23/427 |
| 2020/0365522 A1* | 11/2020 | Wang | H04B 1/036 |
| 2021/0136955 A1* | 5/2021 | Wakaoka | F28D 15/046 |
| 2021/0180873 A1* | 6/2021 | Lin | F28D 15/0233 |
| 2023/0019481 A1 | 1/2023 | Jin et al. | |
| 2023/0107867 A1* | 4/2023 | Yang | F28D 15/046 361/700 |
| 2023/0258412 A1* | 8/2023 | Meng | H05K 7/20 165/104.26 |
| 2024/0114662 A1* | 4/2024 | Kim | C08K 7/02 |

FOREIGN PATENT DOCUMENTS

| | | | | |
|---|---|---|---|---|
| CN | 107509381 A | 12/2017 | | |
| CN | 104813760 B | 2/2018 | | |
| CN | 108617082 A | 10/2018 | | |
| CN | 108617158 A | 10/2018 | | |
| CN | 108702858 A | 10/2018 | | |
| CN | 207969297 U | 10/2018 | | |
| CN | 110658667 A | 1/2020 | | |
| CN | 110662410 A | 1/2020 | | |
| CN | 110730605 A | * | 1/2020 | ............ H05K 1/181 |
| CN | 210671094 U | 6/2020 | | |
| CN | 213029037 U | 4/2021 | | |
| CN | 112804851 A | 5/2021 | | |
| CN | 112996346 A | 6/2021 | | |
| CN | 115023099 A | 9/2022 | | |
| JP | 2010080854 A | 4/2010 | | |
| JP | 2014053460 A | 3/2014 | | |
| WO | 2016179915 A1 | 11/2016 | | |
| WO | 2021143674 A1 | 7/2021 | | |

* cited by examiner

ELECTRONIC DEVICE

CROSS-REFERENCE TO RELATED APPLICATIONS

This application is a national stage of International Application No. PCT/CN2022/113558, filed on Aug. 19, 2022, which claims priority to Chinese Patent Application No. 202111328232.6, filed on Nov. 10, 2021. The disclosures of both of the aforementioned applications are hereby incorporated by reference in their entireties.

TECHNICAL FIELD

Embodiments of this application relate to the field of terminal technologies, and in particular, to an electronic device.

BACKGROUND

With an explosive growth of electronic devices such as smartphones or tablet computers (portable equipment, PAD), the electronic devices provide more and more functions. Different electronic components, such as a central processing unit (CPU, Central Processing Unit), an intelligent algorithm chip, or a power management integrated circuit (Power Management IC, PMIC), are integrated inside a housing of an electronic device. These electronic components generate a large amount of heat in an operating status. When accumulated inside the electronic device, the heat affects performance of the electronic components. Therefore, it is necessary to dissipate the heat in time by using a heat dissipation structure. At present, a shielding case is disposed on a periphery of the electronic components, to reduce interference of an external signal with the electronic components. Heat dissipation is performed on the electronic components by using the shielding case and the housing. However, this heat dissipation structure design has a problem of deviation from a desired heat dissipation effect.

SUMMARY

An embodiment of this application provides an electronic device, to improve a heat dissipation effect and implement fast heat dissipation of electronic components.

A first aspect of this application provides an electronic device. The electronic device includes at least a mainboard, electronic components, and a shielding assembly. The electronic components are disposed on the mainboard. The shielding assembly includes a shielding case, a capillary structure, and a thermally conductive plate. The electronic components are located in the shielding case and connected to the shielding case. The mainboard is connected to the shielding case to form a shielding space for shielding the electronic components. The thermally conductive plate is located on a side of the shielding case that faces away from the electronic components. The thermally conductive plate is connected to the shielding case to form a sealing cavity. The capillary structure is disposed in the sealing cavity. The sealing cavity is filled with a working substance. The sealing cavity includes a vaporization zone and a condensation zone. The vaporization zone is located above the electronic components. The capillary structure is configured to enable the working substance to back flow from the condensation zone to the vaporization zone.

In the electronic device in this embodiment of this application, the capillary structure is disposed between the shielding case and the thermally conductive plate of the shielding assembly. After the sealing cavity is filled with the working substance, the working substance may circulate between the vaporization zone and the condensation zone for heat exchange, so that heat at the electronic components may be conducted to a region of the shielding assembly that is away from the electronic components. The shielding assembly in this embodiment of this application can increase a heat dissipation area and a heat dissipation rate, thereby improving heat dissipation efficiency, implementing rapid cooling of the electronic components, and improving a heat dissipation effect.

In a possible implementation, the capillary structure and the shielding case are an integrally formed structure. In a manner of directly forming the capillary structure on the shielding case, it is unnecessary to connect the capillary structure to the shielding case by using an assembly operation such as sintering. This helps reduce operations for assembling and connecting the shielding case and the additionally disposed capillary structure. In addition, if the shielding case is connected to the capillary structure by assembly, there is a possibility that the capillary structure and the shielding case are separated or misaligned when the capillary structure is subjected to an external force, and the possibility of the foregoing problem can be reduced by directly forming the capillary structure on the shielding case in this application.

In a possible implementation, capillary grooves exist on a surface of the shielding case that faces the sealing cavity. The capillary grooves form the capillary structure.

In a possible implementation, an etching process is used to form the capillary structure on the surface of the shielding case that faces the sealing cavity.

In a possible implementation, a first recessed portion is disposed on a surface of the shielding case that faces the thermally conductive plate. The sealing cavity includes the first recessed portion. The capillary structure is disposed in the first recessed portion.

In a possible implementation, at least a portion of the thermally conductive plate is located in the first recessed portion. With at least a portion of the thermally conductive plate located in the first recessed portion, a total thickness of the shielding case and the thermally conductive plate is reduced. This makes the shielding assembly have a more compact structure, and reduces space occupancy of the shielding assembly. In addition, as at least a portion of the thermally conductive plate is accommodated in the first recessed portion, the shielding case can provide protection on the portion of the thermally conductive plate that is accommodated in the first recessed portion, so that the portion of the thermally conductive plate is not easily broken or deformed due to a collision against an external structural member.

In a possible implementation, a protective layer is disposed on at least one of the surface of the shielding case that faces the sealing cavity and a surface of the thermally conductive plate that faces the sealing cavity. The protective layer may be configured to isolate the working substance in the sealing cavity and the thermally conductive plate, so that the working substance is not prone to a chemical reaction caused by contact with the thermally conductive plate, thereby reducing a possibility that the thermally conductive plate is oxidized or corroded by the working substance.

In a possible implementation, a material of the shielding case is any one of steel, titanium, and a titanium alloy. A material of the thermally conductive plate is any one of steel, titanium, and a titanium alloy. A material of the protective layer is copper or a copper alloy.

In a possible implementation, the shielding case includes a side plate and a top plate. The side plate is connected to the mainboard. The top plate is connected to the thermally conductive plate to form the sealing cavity.

In a possible implementation, the sealing cavity is a vacuum cavity. The working substance in the vaporization zone of the sealing cavity can be vaporized from a liquid phase to form vapor in a vacuum environment. The working substance generates a large amount of latent heat when a phase change phenomenon occurs, and a volume of the working substance rapidly increases in the vacuum environment after the working substance forms the vapor, thereby helping improve the heat dissipation effect.

In a possible implementation, the thermally conductive plate is soldered to and sealed with the shielding case. With the thermally conductive plate soldered to and sealed with the shielding case, strength and stability of the connection between the thermally conductive plate and the shielding case are high, and the thermally conductive plate and the shielding case are not easily separated. This can effectively improve reliability of the sealing between the thermally conductive plate and the shielding case.

In a possible implementation, the shielding assembly further includes a shielding frame. The shielding frame is connected to the mainboard. The shielding case is connected to the shielding frame.

In a possible implementation, the shielding case includes the side plate and the top plate. The shielding frame includes a side portion and a top portion. The top portion has an avoidance hole for avoiding the electronic components. The side plate is detachably connected to the side portion. The top plate is covered on the avoidance hole. The electronic components can be detected or maintained through the avoidance hole. The shielding case is detachably connected to the shielding frame to improve detection or maintenance convenience of the electronic components.

In a possible implementation, the electronic device further includes a housing. The thermally conductive plate is connected to the housing. The electronic device further includes a first thermally conductive member and a second thermally conductive member. The first thermally conductive member is disposed between the electronic components and the shielding case. The heat at the electronic components may be conducted to the region of the shielding assembly that is away from the electronic components, then to the housing through the shielding assembly, and ultimately to the outside of the electronic device through the housing. The first thermally conductive member can fill a gap between the electronic components and the shielding case. This helps reduce thermal resistance between the electronic components and the shielding case, and improve heat conduction efficiency between the electronic components and the shielding case. The second thermally conductive member is disposed between the thermally conductive plate and the housing. The second thermally conductive member can fill a gap between the shielding case and the housing. This helps reduce thermal resistance between the shielding case and the housing and improve heat conduction efficiency between the shielding case and the housing.

In a possible implementation, both the first thermally conductive member and the second thermally conductive member are elastic. The electronic components and the shielding case may jointly apply a compressive stress to the first thermally conductive member, so that the first thermally conductive member is deformed. In this way, the first thermally conductive member can better fit with the electronic components and the shielding case, and reduce a possibility that the heat conduction efficiency is affected due to increased thermal resistance caused by existence of a gap between the first thermally conductive member and the electronic components or a gap between the first thermally conductive member and the shielding case. The thermally conductive plate and the housing may jointly apply a compressive stress to the second thermally conductive member, so that the second thermally conductive member is deformed. In this way, the second thermally conductive member can better fit with the thermally conductive plate and the housing, and reduce a possibility that the heat conduction efficiency is affected due to increased thermal resistance caused by existence of a gap between the second thermally conductive member and the shielding case or a gap between the second thermally conductive member and the housing.

In a possible implementation, the first thermally conductive member is thermally conductive adhesive. The second thermally conductive member is thermally conductive adhesive or a graphite sheet.

In a possible implementation, the shielding assembly further includes a support column. The support column is located in the sealing cavity. One end of the support column is connected to the shielding case and the other end thereof is connected to the thermally conductive plate. The support column can provide a support force to the thermally conductive plate, to reduce a possibility of collapse and deformation of the thermally conductive plate towards the shielding case due to lack of support from below, so that a surface of the thermally conductive plate that faces away from the shielding case may be in a flat state.

In a possible implementation, the support column and the thermally conductive plate are an integrally formed structure. The support column is directly processed and formed on the thermally conductive plate, to ensure high strength of the connection between the thermally conductive plate and the support column, and reduce a possibility that the support column is detached from the thermally conductive plate due to an external force or that the support column is bent and loses a support function due to an external force.

In a possible implementation, the thermally conductive plate has a second recessed portion. The support column is located in the second recessed portion. The sealing cavity includes the second recessed portion.

A second aspect of this application provides a manufacturing method for an electronic device, comprising:

providing a mainboard;

providing electronic components, and connecting the electronic components to the mainboard;

providing a shielding assembly, where the shielding assembly includes a shielding case, a capillary structure, and a thermally conductive plate, the thermally conductive plate is connected to the shielding case to form a sealing cavity, the capillary structure is disposed in the sealing cavity, the sealing cavity is filled with a working substance, the sealing cavity includes a vaporization zone and a condensation zone, and the capillary structure is configured to enable the working substance to back flow from the condensation zone to the vaporization zone; and connecting the shielding case to the mainboard to form a shielding space for accommodating and shielding the electronic components, where the electronic components are connected to the shielding case, the thermally conductive plate is located on a side of the shielding case that faces away from the electronic components, and the vaporization zone is located above the electronic components.

In an electronic device manufactured by using the manufacturing method for an electronic device in this embodiment of this application, the capillary structure is disposed between the shielding case and the thermally conductive plate of the shielding assembly. The working substance filled in the sealing cavity may circulate between the vaporization zone and the condensation zone for heat exchange, so that heat at the electronic components may be conducted to a region of the shielding assembly that is away from the electronic components. The shielding assembly in this embodiment of this application can increase a heat dissipation area and a heat dissipation rate, thereby improving heat dissipation efficiency, implementing rapid cooling of the electronic components, and improving a heat dissipation effect.

In a possible implementation, in the step of providing the shielding assembly: the capillary structure is processed and formed in a region of the shielding case that faces away the electronic components. The capillary structure and the shielding case are an integrally formed structure. In a manner of directly forming the capillary structure on the shielding case, it is unnecessary to connect the capillary structure to the shielding case by using an assembly operation such as sintering. This helps reduce operations for assembling and connecting the shielding case and the additionally disposed capillary structure. In addition, if the shielding case is connected to the capillary structure by assembly, there is a possibility that the capillary structure and the shielding case are separated or misaligned when the capillary structure is subjected to an external force, and the possibility of the foregoing problem can be reduced by directly forming the capillary structure on the shielding case in this application.

In a possible implementation, capillary grooves are processed and formed in the region of the shielding case that faces away the electronic components, and the capillary grooves form the capillary structure.

In a possible implementation, an etching process is used to form the capillary grooves on the surface of the shielding case that faces the sealing cavity.

In a possible implementation, in the step of providing the shielding assembly: a first recessed portion is processed and formed on a surface of the shielding case that faces the thermally conductive plate, the sealing cavity includes the first recessed portion, and the capillary structure is disposed in the first recessed portion.

In a possible implementation, at least a portion of the thermally conductive plate is located in the first recessed portion. With at least a portion of the thermally conductive plate located in the first recessed portion, a total thickness of the shielding case and the thermally conductive plate is reduced. This makes the shielding assembly have a more compact structure, and reduces space occupancy of the shielding assembly. In addition, as at least a portion of the thermally conductive plate is accommodated in the first recessed portion, the shielding case can provide protection on the portion of the thermally conductive plate that is accommodated in the first recessed portion, so that the portion of the thermally conductive plate is not easily broken or deformed due to a collision against an external structural member.

In a possible implementation, in the step of providing the shielding assembly: a protective layer is disposed on at least one of the surface of the shielding case that faces the sealing cavity and a surface of the thermally conductive plate that faces the sealing cavity. The protective layer may be configured to isolate the working substance in the sealing cavity and the thermally conductive plate, so that the working substance is not prone to a chemical reaction caused by contact with the thermally conductive plate, thereby reducing a possibility that the thermally conductive plate is oxidized or corroded by the working substance.

In a possible implementation, a material of the shielding case is any one of steel, titanium, and a titanium alloy. A material of the thermally conductive plate is any one of steel, titanium, and a titanium alloy. A material of the protective layer is copper or a copper alloy.

In a possible implementation, in the step of providing the shielding assembly, the shielding case includes a side plate and a top plate, the side plate of the shielding case is connected to the mainboard, and the top plate of the shielding case is connected to the thermally conductive plate to form the sealing cavity.

In a possible implementation, the sealing cavity is vacuumized. The sealing cavity is a vacuum cavity. The working substance in the vaporization zone of the sealing cavity can be vaporized from a liquid phase to form vapor in a vacuum environment. The working substance generates a large amount of latent heat when a phase change phenomenon occurs, and a volume of the working substance rapidly increases in the vacuum environment after the working substance forms the vapor, thereby helping improve the heat dissipation effect.

In a possible implementation, in the step of providing the shielding assembly, the thermally conductive plate is soldered to and sealed with the shielding case to form the sealing cavity. With the thermally conductive plate soldered to and sealed with the shielding case, strength and stability of the connection between the thermally conductive plate and the shielding case are high, and the thermally conductive plate and the shielding case are not easily separated. This can effectively improve reliability of the sealing between the thermally conductive plate and the shielding case.

In a possible implementation, in the step of providing the shielding assembly, the shielding assembly further includes a shielding frame, the shielding frame is connected to the mainboard, and the shielding case is connected to the shielding frame.

In a possible implementation, the shielding case includes the side plate and the top plate. The shielding frame includes a side portion and a top portion. The top portion of the shielding frame has an avoidance hole for avoiding the electronic components. The side plate of the shielding case is detachably connected to the side portion of the shielding frame. The top plate of the shielding case is covered on the avoidance hole. The electronic components can be detected or maintained through the avoidance hole. The shielding case is detachably connected to the shielding frame to improve detection or maintenance convenience of the electronic components.

In a possible implementation, a housing, a first thermally conductive member, and a second thermally conductive member are provided, the first thermally conductive member is disposed on the electronic components or the shielding case, the first thermally conductive member is located between the electronic components and the shielding case after the shielding case is connected to the mainboard, the second thermally conductive member is disposed on the thermally conductive plate or the housing, and the thermally conductive plate is connected to the housing by using the second thermally conductive member. The first thermally conductive member is disposed between the electronic components and the shielding case. The heat at the electronic components may be conducted to the region of the shielding assembly that is away from the electronic components, then to the housing through the shielding assembly, and ultimately to the outside of the electronic device through the housing. The first thermally conductive member can fill a gap between the electronic components and the shielding case. This helps reduce thermal resistance between the electronic components and the shielding case, and improve heat conduction efficiency between the electronic components and the shielding case. The second thermally conductive member is disposed between the thermally conductive plate and the housing. The second thermally conductive member can fill a gap between the shielding case and the housing. This helps reduce thermal resistance between the shielding case and the housing and improve heat conduction efficiency between the shielding case and the housing.

In a possible implementation, both the first thermally conductive member and the second thermally conductive member are elastic. The electronic components and the shielding case may jointly apply a compressive stress to the first thermally conductive member, so that the first thermally conductive member is deformed. In this way, the first thermally conductive member can better fit with the electronic components and the shielding case, and reduce a possibility that the heat conduction efficiency is affected due to increased thermal resistance caused by existence of a gap between the first thermally conductive member and the electronic components or a gap between the first thermally conductive member and the shielding case. The thermally conductive plate and the housing may jointly apply a compressive stress to the second thermally conductive member, so that the second thermally conductive member is deformed. In this way, the second thermally conductive member can better fit with the thermally conductive plate and the housing, and reduce a possibility that the heat conduction efficiency is affected due to increased thermal resistance caused by existence of a gap between the second thermally conductive member and the shielding case or a gap between the second thermally conductive member and the housing.

In a possible implementation, the first thermally conductive member is thermally conductive adhesive. The second thermally conductive member is thermally conductive adhesive or a graphite sheet.

In a possible implementation, in the step of providing the shielding assembly, the shielding assembly further includes a support column. The support column is located in the sealing cavity. One end of the support column is connected to the shielding case and the other end thereof is connected to the thermally conductive plate. The support column can provide a support force to the thermally conductive plate, to reduce a possibility of collapse and deformation of the thermally conductive plate towards the shielding case due to lack of support from below, so that a surface of the thermally conductive plate that faces away from the shielding case may be in a flat state.

In a possible implementation, the support column and the thermally conductive plate are an integrally formed structure. The support column is directly processed and formed on the thermally conductive plate, to ensure high strength of the connection between the thermally conductive plate and the support column, and reduce a possibility that the support column is detached from the thermally conductive plate due to an external force or that the support column is bent and loses a support function due to an external force.

In a possible implementation, in the step of providing the shielding assembly, a second recessed portion is processed and formed on a surface of the thermally conductive plate that faces the shielding case, and the support column is located in the second recessed portion. The sealing cavity includes the second recessed portion.

DESCRIPTION OF REFERENCE NUMERALS

10: electronic device; 20: display assembly; 30: housing; 40: mainboard; 50: electronic components; and 60: shielding box;
70: shielding assembly; 701: sealing cavity; 701*a*: vaporization zone; 701*b*: condensation zone; and 701*c*: transition zone;

71: shielding case; 711: side plate; 711a: protrusion; 712: top plate; and 713: first recessed portion;
72: capillary structure; and 721: capillary groove;
73: thermally conductive plate; and 731: second recessed portion;
74: protective layer;
75: shielding frame; 751: side portion; 752: top portion; and 753: avoidance hole;
76: support column; and
80: first thermally conductive member; 90: second thermally conductive member; 99: thermal interface material; 100: shielding space; and 200: solder mark.

DETAILED DESCRIPTION OF ILLUSTRATIVE EMBODIMENTS

An electronic device in the embodiments of this application may be referred to as user equipment (user equipment, UE), a terminal (terminal), or the like. For example, the electronic device may be a mobile terminal or a fixed terminal such as a tablet computer (portable android device, PAD), a personal digital assistant (personal digital assistant, PDA), a handheld device with a wireless communication function, a computing device, a vehicle-mounted device, a wearable device, a virtual reality (virtual reality, VR) terminal device, an augmented reality (augmented reality, AR) terminal device, an industrial control (industrial control) wireless terminal, a self driving (self driving) wireless terminal, a remote medical (remote medical) wireless terminal, a smart grid (smart grid) wireless terminal, a transportation safety (transportation safety) wireless terminal, a smart city (smart city) wireless terminal, or a smart home (smart home) wireless terminal. A form of the terminal device is not specifically limited in the embodiments of this application.

Figure 1:
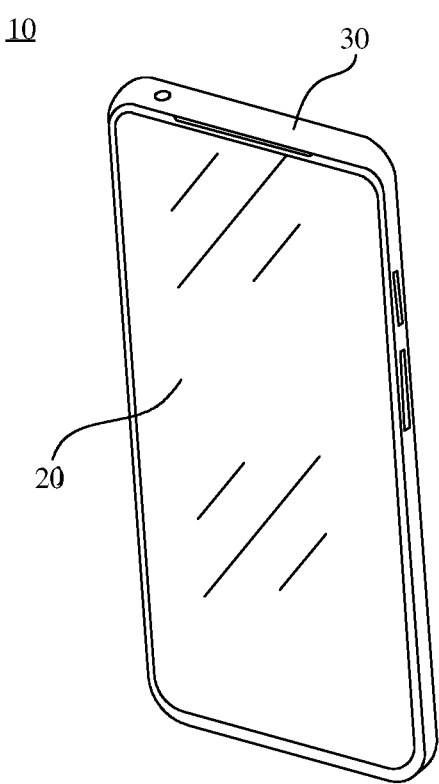
FIG. 1 is a schematic diagram of a structure of an electronic device according to an embodiment of this application.

FIG. 1 schematically shows a structure of an electronic device 10 according to an embodiment of this application. As shown in FIG. 1, the following provides a description by using an example in which the electronic device 10 is a handheld device with a wireless communication function. The handheld device with a wireless communication function may be, for example, a mobile phone.

Figure 2:
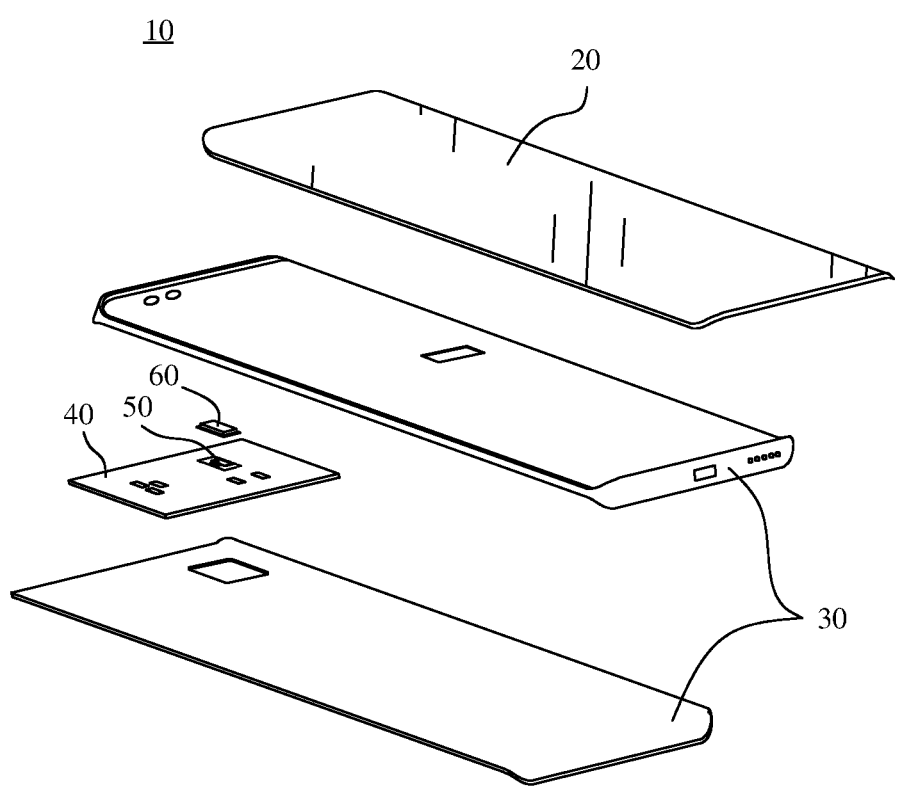
FIG. 2 is a schematic diagram of a breakdown structure of an electronic device according to a related technology.
Figure 3:
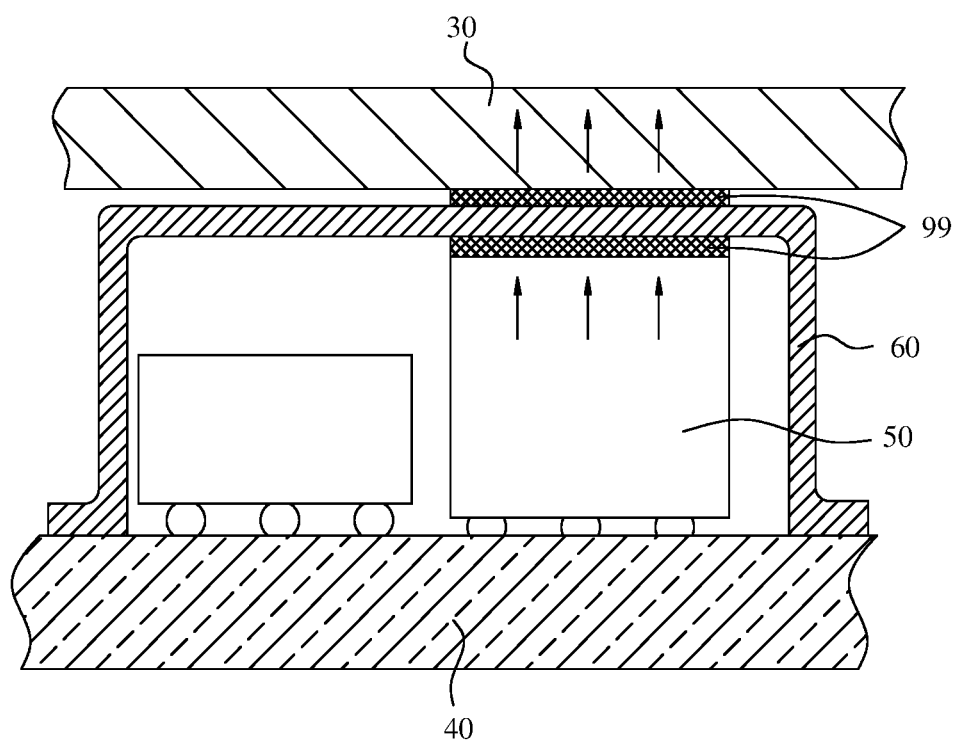
FIG. 3 is a schematic diagram of a partial cross-sectional structure of an electronic device according to a related technology.

FIG. 2 schematically shows a partial breakdown structure of the electronic device 10. FIG. 3 schematically shows a partial cross-sectional structure of the electronic device 10. As shown in FIG. 2 and FIG. 3, the electronic device 10 in this embodiment of this application includes a display assembly 20, a housing 30, a mainboard 40, electronic components 50, and a shielding box 60.

The display assembly 20 has a display region for displaying image information. The display assembly 20 is mounted in the housing 30, and the display region of the display assembly 20 is exposed to facilitate presentation of image information to a user. The mainboard 40 is connected to the housing 30 and is located on an inner side of the display assembly 20, so that a user cannot easily observe the mainboard 40 from the outside of the electronic device 10.

The electronic components 50 are disposed on the mainboard 40. The mainboard 40 may be a printed circuit board (Printed Circuit Board, PCB). The electronic components 50 are soldered to the mainboard 40 by using a soldering process. The electronic components 50 include but are not limited to a central processing unit (CPU, Central Processing Unit), an intelligent algorithm chip, or a power management integrated circuit (Power Management IC, PMIC). The electronic components 50 may be main heat generating chips in the electronic device 10. As an internal space of the electronic device 10 is relatively small, the electronic components 50 are highly integrated on the mainboard 40 to sufficiently reduce a volume of the mainboard 40 and reduce space occupancy of the mainboard 40. After the electronic components 50 are highly integrated, heat generated by the electronic components 50 is easily gathered in a particular space. This causes a temperature of the electronic components 50 to rise and affects operation performance of the electronic components 50. For example, in a scenario in which a user uses the electronic device 10 to play a game, play a video, or make a call for a long time, the electronic components 50 of the electronic device 10 generate a large amount of heat and form a heat source due to long-time continuous operation. The user can perceive an obvious temperature rise of the electronic device 10 from the outside of the electronic device 10. Therefore, it is necessary to dissipate the heat from the inside of the electronic device 10 to the outside of the electronic device 10 in time, so that an ambient temperature at a location of the electronic components 50 falls within a normal operating temperature range, to ensure operation stability of the electronic components 50.

The shielding box 60 is disposed outside the electronic components 50, and the shielding box 60 is covered on the electronic components 50. The shielding box 60 is connected to the mainboard 40 to form a shielding space 100. For example, the shielding box 60 is soldered to the mainboard 40 by using a soldering process. The electronic components 50 are located in the shielding space 100. The shielding box 60 may be configured to shield the electronic components 50, to reduce interference caused to the electronic components 50 by an electromagnetic signal of another component or an electromagnetic signal in an environment in which the electronic device 10 is located.

In a related technology, a thermal interface material 99 is disposed between the electronic components 50 and the shielding box 60. A thermal interface material 99 is also disposed between the shielding box 60 and the housing 30. The shielding box 60 is a single-layer stainless steel plate. The heat generated by the electronic components 50 needs to be dissipated by using the thermal interface material 99, the shielding box 60, the thermal interface material 99, and the housing 30. Due to large thermal resistance occurring when solids come into contact, the heat generated by the electronic components 50 needs to be dissipated from the electronic components 50 to the housing 30 through the two layers of thermal interface materials 99 and one layer of shielding box 60. Consequently, the heat at the electronic components 50 cannot be rapidly dissipated, resulting in deviation from a desired heat dissipation effect. In addition, an area of the thermal interface material 99 between the electronic components 50 and the shielding box 60 is small, and the heat is mainly dissipated through the thermal interface material 99 and a region of the shielding box 60 that corresponds to the thermal interface material 99. The heat is conducted slowly to a region that is of the thermal interface material 99 between the shielding box 60 and the housing 30 and that is away from the electronic components 50, resulting in a small overall heat dissipation area and deviation from the desired heat dissipation effect.

In the electronic device 10 provided in this embodiment of this application, the shielding assembly can quickly direct, to a region of the shielding case that is away from the electronic components 50, the heat conducted from the electronic components 50 to the shielding case, thereby improving heat dissipation efficiency, improving a heat dissipation effect, and ensuring that an operating temperature of the electronic components 50 is at a normal level. In addition, because a heat dissipation area of the shielding assembly is increased, heat dissipation efficiency between the shielding assembly and the housing 30 is improved, which facilitates rapid heat dissipation and improves the heat dissipation effect.

The following describes an implementation of the electronic device 10 provided in this embodiment of this application.

Figure 4:
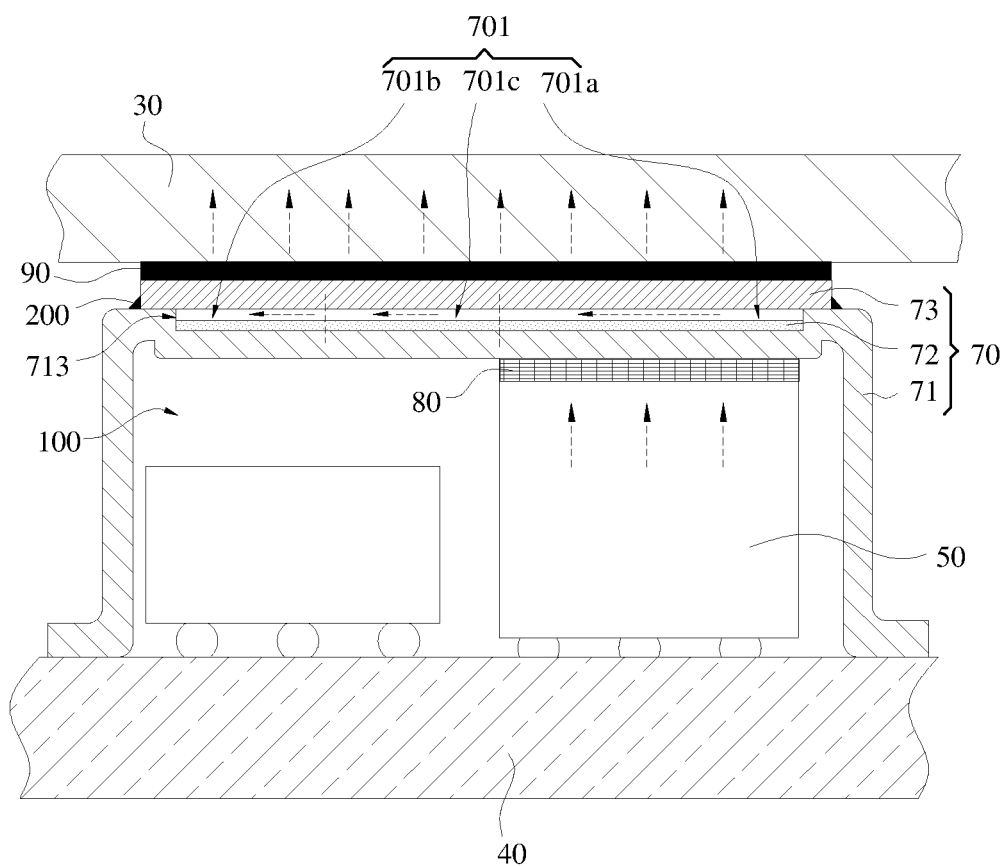
FIG. 4 is a schematic diagram of a partial cross-sectional structure of an electronic device according to an embodiment of this application.

FIG. 4 schematically shows a partial cross-sectional structure of the electronic device 10 according to an embodiment. As shown in FIG. 4, the electronic device 10 in this embodiment of this application includes a mainboard 40, electronic components 50, and a shielding assembly 70. The electronic components 50 are disposed on the mainboard 40. The shielding assembly 70 is connected to the mainboard 40 to form a shielding space 100. The electronic components 50 are located in the shielding space 100. The shielding assembly 70 includes a shielding case 71, a capillary structure 72, and a thermally conductive plate 73. The electronic components 50 are located in and connected to the shielding case 71, so as to exchange heat with the shielding case 71. The mainboard 40 is connected to the shielding case 71 to form the shielding space 100 for shielding the electronic components 50. The thermally conductive plate 73 is located on a side of the shielding case 71 that faces away from the electronic components 50. The thermally conductive plate 73 is connected to the shielding case 71 to form a sealing cavity 701. The capillary structure 72 is disposed in the sealing cavity 701. The sealing cavity 701 is filled with a working substance (not shown in the figure). The sealing cavity 701 includes a vaporization zone 701a and a condensation zone 701b. The vaporization zone 701a is located above the electronic components 50. The condensation zone 701b is away from the electronic components 50. The capillary structure 72 is configured to generate a capillary force, so that the working substance back flows from the condensation zone 701b to the vaporization zone 701a.

The working substance refers to a medium for heat exchange. For example, the working substance may be water. The electronic components 50 operate, generate heat, and become a heat source. The heat of the electronic components 50 may be conducted to the vaporization zone 701a through the shielding case 71. The working substance located in the vaporization zone 701a absorbs the heat from the heat source and is vaporized into vapor. The vapor diffuses and flows to the condensation zone 701b and condenses in the condensation zone 701b to release heat. The capillary structure 72 absorbs the condensed working substance from the condensation zone 701b to the vaporization zone 701a through the capillary action to reabsorb heat. In this way, the working substance circulates for heat exchange, so that heat is continuously absorbed from the vaporization zone 701a and the heat is released in the condensation zone 701b to form a circulating heat exchange system with both a gas phase and a liquid phase.

Figure 5:
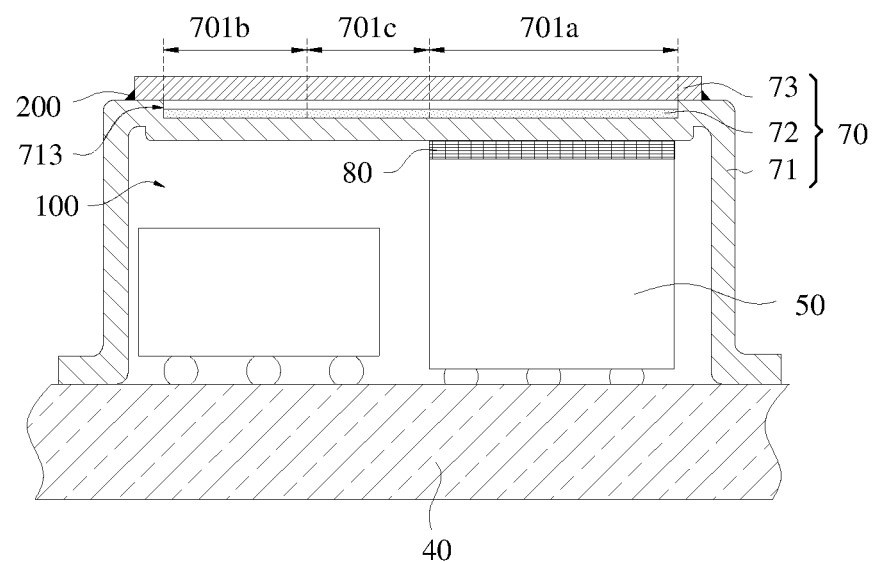
FIG. 5 is a schematic diagram of a partial cross-sectional structure of an electronic device according to another embodiment of this application.

As shown in FIG. 4 and FIG. 5, the sealing cavity 701 further includes a transition zone 701c. The transition zone 701c is located between the vaporization zone 701a and the condensation zone 701b. The vapor formed by vaporizing the working substance in the vaporization zone 701a may diffuse to the transition zone 701c. When the vapor passes through the transition zone 701c, heat is released, and a temperature decreases, but no condensation occurs. After passing through the transition zone 701c, the vapor diffuses to the condensation zone 701b and condenses in the condensation zone 701b to release heat.

The electronic components 50 and other components may be disposed in the shielding case 71. An area of a region of the electronic components 50 that corresponds to the shielding case 71 is less than an area of a region of the shielding case 71 that corresponds to the housing 30. The vaporization zone 701a of the sealing cavity 701 may be covered on the corresponding electronic components 50. An orthographic projection of the electronic components 50 on the mainboard 40 is located within an orthographic projection of the vaporization zone 701a of the sealing cavity 701 on the mainboard 40.

In the electronic device 10 in this embodiment of this application, the capillary structure 72 is disposed between the shielding case 71 and the thermally conductive plate 73 of the shielding assembly 70. After the sealing cavity 701 is filled with the working substance, the working substance may circulate between the vaporization zone 701a and the condensation zone 701b for heat exchange, so that the heat at the electronic components 50 may be conducted to a region of the shielding assembly 70 that is away from the electronic components 50. The shielding assembly 70 in this embodiment of this application can increase a heat dissipation area and a heat dissipation rate, thereby improving heat dissipation efficiency, implementing rapid cooling of the electronic components 50, and improving a heat dissipation effect.

As shown in FIG. 4 and FIG. 5, the capillary structure 72 and the shielding case 71 may be separate structures. A first recessed portion 713 is disposed on a surface of the shielding case 71 that faces the thermally conductive plate 73. The capillary structure 72 is disposed in the first recessed portion 713. The capillary structure 72 may be, but is not limited to, a porous medium using copper as a substrate, for example, may be a copper mesh, sintered copper powder, or foamed copper. The capillary structure 72 may be connected to the shielding case 71 in a sintering manner.

For example, a stamping process may be used to form the first recessed portion 713 on the shielding case 71. Specifically, a compressive stress is applied to a predetermined region of the shielding case 71, so that the predetermined region is recessed towards the inside of the shielding case 71 to form the first recessed portion 713.

Figure 6:
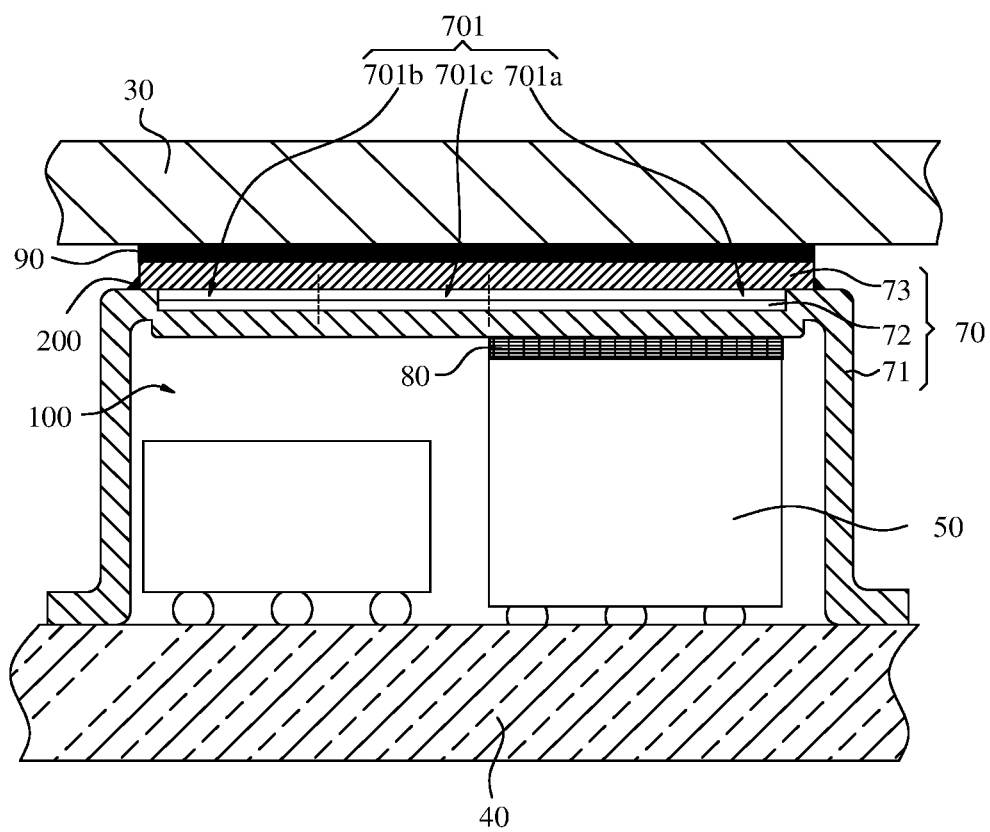
FIG. 6 is a schematic diagram of a partial cross-sectional structure of an electronic device according to still another embodiment of this application.

FIG. 6 schematically shows a partial cross-sectional structure of the electronic device 10 according to still another embodiment. As shown in FIG. 6, the capillary structure 72 and the shielding case 71 may be an integrally formed structure. Integral forming of the capillary structure 72 and the shielding case 71 means that the capillary structure 72 is directly processed and manufactured on the shielding case 71, so that the capillary structure 72 and the shielding case 71 are an integral and inseparable structure. In a manner of directly forming the capillary structure 72 on the shielding case 71, it is unnecessary to connect the capillary structure 72 to the shielding case 71 by using an assembly operation such as sintering. This helps reduce operations for assembling and connecting the shielding case 71 and the additionally disposed capillary structure 72. In addition, if the shielding case 71 is connected to the capillary structure 72 by assembly, there is a possibility that the capillary structure 72 and the shielding case 71 are separated or misaligned when the capillary structure 72 is subjected to an external force, and the possibility of the foregoing problem can be reduced by directly forming the capillary structure 72 on the shielding case 71 in this application.

Figure 7:
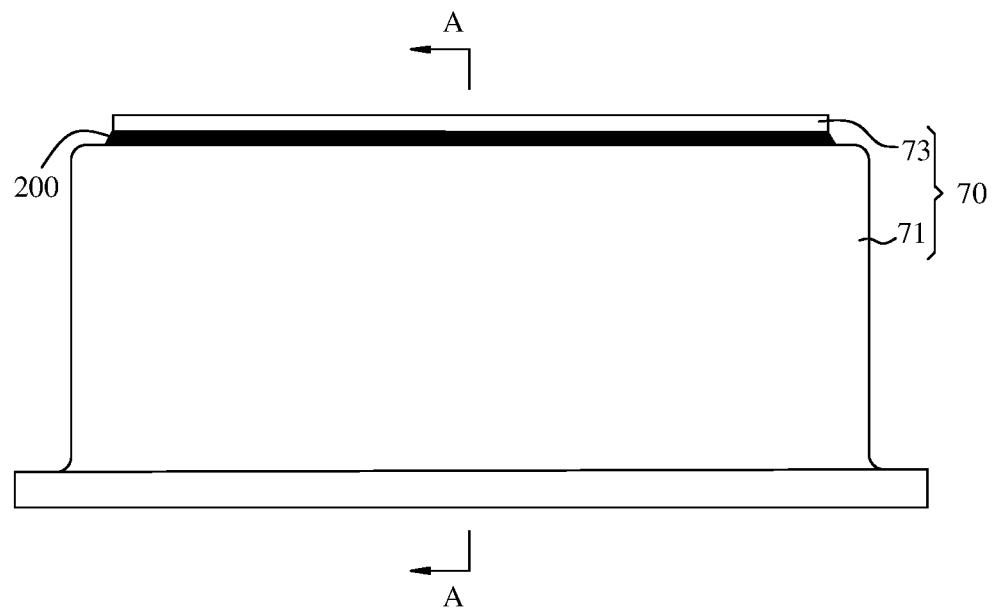
FIG. 7 is a schematic diagram of a structure of a shielding assembly according to an embodiment of this application.
Figure 8:
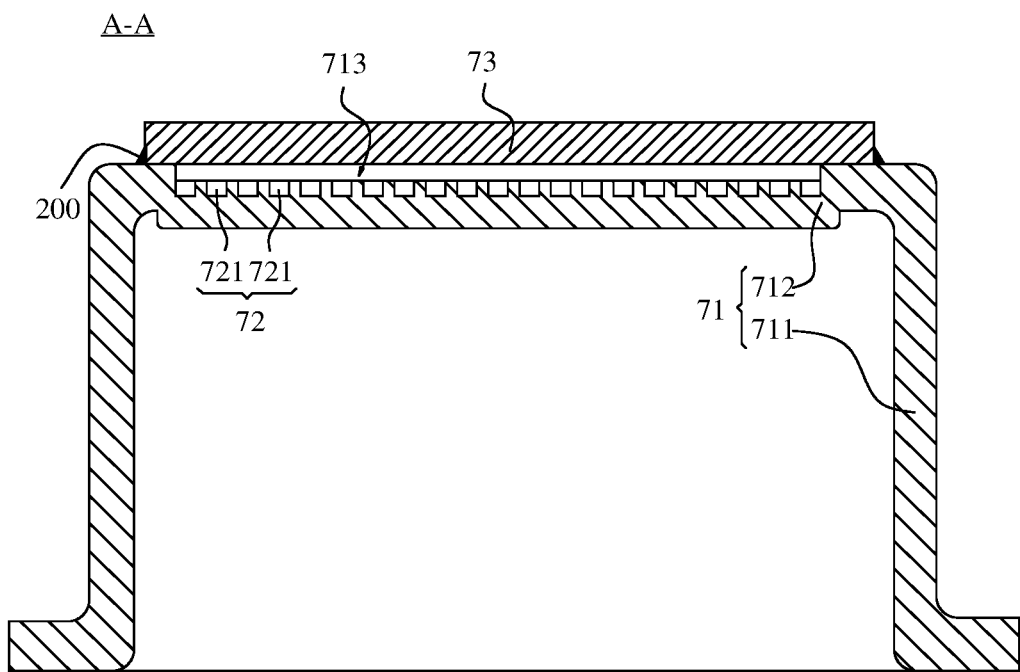
FIG. 8 is a schematic diagram of a cross-sectional structure along an A-A direction in FIG. 7.

In some implementations, as shown in FIG. 7 and FIG. 8, capillary grooves 721 exist on a surface of the shielding case 71 that faces the sealing cavity 701. The capillary grooves 721 form the capillary structure 72. The capillary grooves 721 extend in a direction from the vaporization zone 701a to the condensation region 701b. The capillary grooves 721 may be continuously extending groove structures, so that the working substance can flow smoothly in the capillary grooves 721. The working substance in the capillary grooves 721 of the vaporization zone 701a is vaporized into vapor after absorbing external heat, and the vapor leaves the capillary grooves 721 and flows towards the condensation zone 701b. The vapor is liquified after condensation and heat release in the condensation zone 701b. The capillary grooves 721 of the condensation zone 701b absorb the working substance and transfer the working substance to the vaporization zone 701a by using a capillary force.

In some examples, a plurality of capillary grooves 721 are disposed on the shielding case 71, so that more working substance can be absorbed to the vaporization zone 701a for heat exchange per unit time. This helps improve heat exchange efficiency. The plurality of capillary grooves 721 may be spaced from each other. The capillary grooves 721 may be micro grooves having a width less than 0.1 micrometers. For example, the width of the capillary grooves 721 may range from 0.02 to 0.1 micrometers. A thickness of the shielding case 71 may be 0.1 micrometers, and a depth of the capillary grooves 721 may range from 0.03 to 0.07 micrometers. For example, a laser etching process or a chemical etching process may be used to directly form the capillary grooves 721 on the surface of the shielding case 71.

For example, as shown in FIG. 8, a first recessed portion 713 is disposed on a surface of the shielding case 71 that faces the thermally conductive plate 73. The capillary grooves 721 are disposed on a bottom wall of the first recessed portion 713. A surface of the thermally conductive plate 73 that faces the shielding case 71 is a flat surface. The thermally conductive plate 73 is a plate body having a uniform thickness. The thermally conductive plate 73 is covered on the first recessed portion 713. The sealing cavity 701 includes the first recessed portion 713 and the capillary grooves 721. A thickness of the shielding case 71 may be 0.1 micrometers. A thickness of the thermally conductive plate 73 may be 0.1 micrometers. In a manner of forming the first recessed portion 713 by using a stamping process, a depth of the first recessed portion 713 may range from 0.03 to 0.07 micrometers. A depth of the capillary grooves 721 does not exceed the thickness of the shielding case 71, for example, the depth of the capillary grooves 721 may range from 0.03 to 0.07 micrometers.

For example, as shown in FIG. 8, edges of the thermally conductive plate 73 are soldered to the shielding case 71 to form solder marks 200. Alternatively, the thermally conductive plate 73 is soldered to a lap region of the shielding case 71 to form a solder mark 200, and the solder mark 200 is covered by the thermally conductive plate 73, so that the solder mark 200 cannot be observed from the outside.

Figure 9:
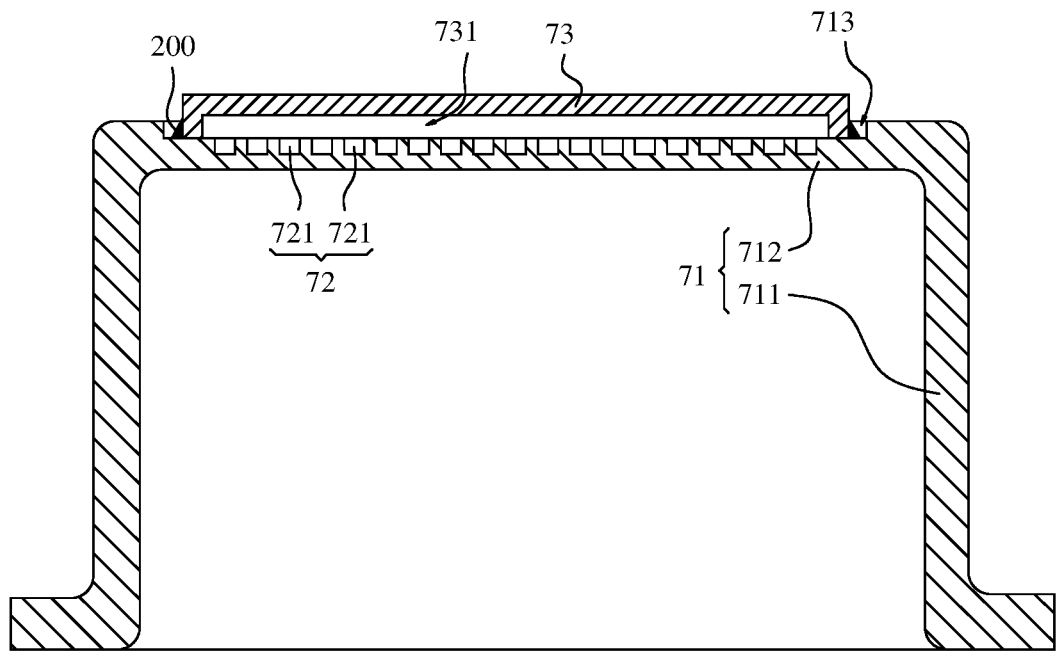
FIG. 9 is a schematic diagram of a structure of a shielding assembly according to another embodiment of this application.

As shown in FIG. 9, at least a portion of the thermally conductive plate 73 is located in the first recessed portion 713. This helps reduce a total thickness of the shielding case 71 and the thermally conductive plate 73, makes the shielding assembly 70 have a more compact structure, and reduces space occupancy of the shielding assembly 70. In addition, as at least a portion of the thermally conductive plate 73 is accommodated in the first recessed portion 713, the shielding case 71 can provide protection on the portion of the thermally conductive plate 73 that is accommodated in the first recessed portion 713, so that the portion of the thermally conductive plate 73 is not easily broken or deformed due to a collision against an external structural member. In an embodiment in which the thermally conductive plate 73 is connected to the shielding case 71 by soldering, the solder mark 200 may be located in the first recessed portion 713, so that the shielding case 71 can also provide protection on the solder mark 200 formed between the thermally conductive plate 73 and the shielding case 71, thereby reducing a possibility that the solder mark 200 is cracked due to a collision. For example, a shape of an outer contour of the thermally conductive plate 73 matches a shape of the first recessed portion 713. The thermally conductive plate 73 is entirely accommodated in the first recessed portion 713. An outer surface of the thermally conductive plate 73 that faces away from the sealing cavity 701 is flush with a surface of the shielding case 71.

For example, an etching process may be used to form the first recessed portion 713 on the shielding case 71. Thinning processing is performed on a predetermined region of the shielding case 71 by using the etching process, to reduce a thickness of the predetermined region and form the first recessed portion 713. A sum of the depth of the capillary grooves 721 and the depth of the first recessed portion 713 does not exceed the thickness of the shielding case 71.

Figure 10:
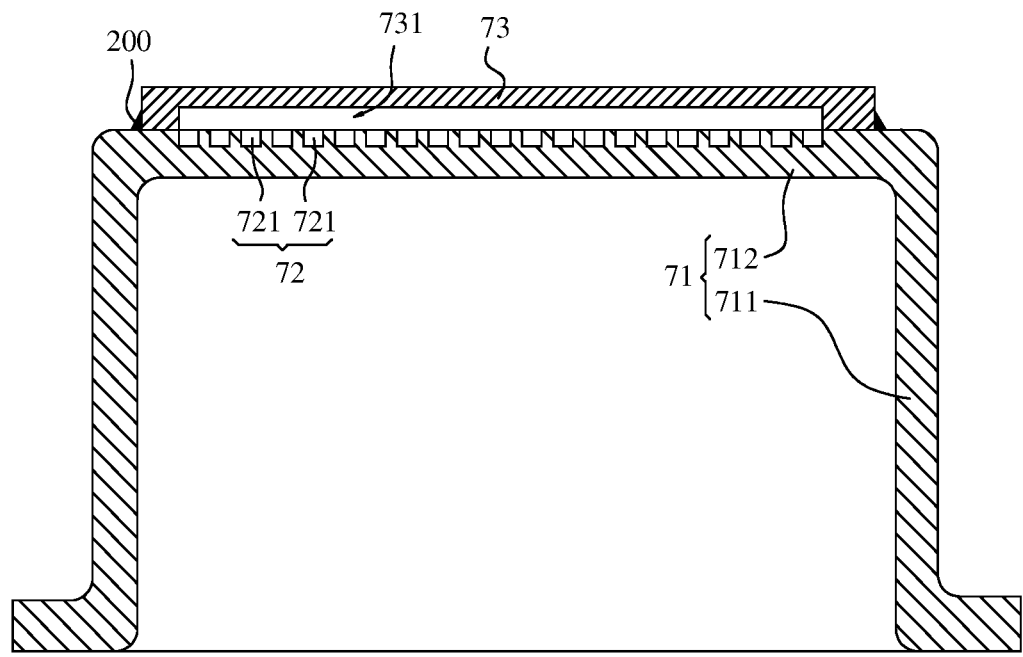
FIG. 10 is a schematic diagram of a structure of a shielding assembly according to another embodiment of this application.

For example, as shown in FIG. 9 and FIG. 10, the surface of the shielding case 71 is a flat surface. The capillary grooves 721 are directly disposed on the surface of the shielding case 71. The thermally conductive plate 73 includes a second recessed portion 731. The thermally conductive plate 73 is connected to the shielding case 71. The capillary grooves 721 communicate with the second recessed portion 731. The sealing cavity 701 includes the second recessed portion 731 and the capillary grooves 721. The working substance located in the vaporization zone 701a absorbs the heat from the heat source and is vaporized into vapor. After the vapor diffuses to a part of the second recessed portion 731 that is located in the condensation region 701b, condensation occurs, and the condensed working substance is absorbed to the capillary grooves 721. The capillary grooves 721 absorb the condensed working substance from the condensation zone 701b to the vaporization zone 701a through the capillary action to reabsorb heat. The vapor formed by vaporizing the working substance leaves the capillary grooves 721 and diffuses to a part of the second recessed portion 731 that is located in the vaporization zone 701a.

For example, a thickness of the shielding case 71 may be 0.1 micrometers. A depth of the capillary grooves 721 may range from 0.03 to 0.07 micrometers. A thickness of the thermally conductive plate 73 may be 0.1 micrometers, and a depth of the second recessed portion 731 may range from 0.05 to 0.07 micrometers.

Figure 11:
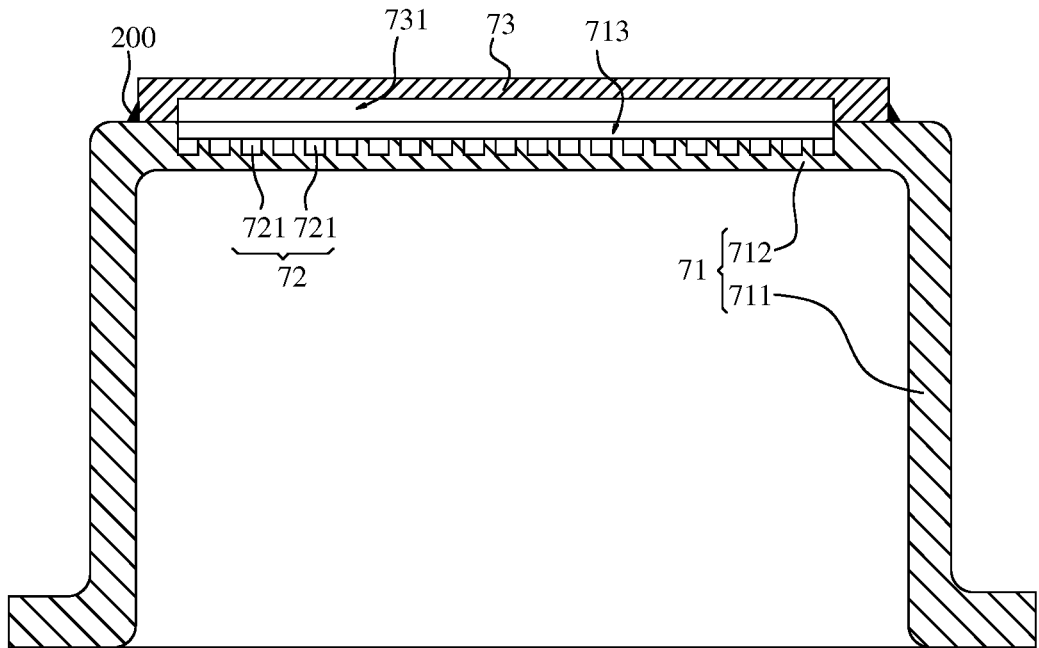
FIG. 11 is a schematic diagram of a structure of a shielding assembly according to another embodiment of this application.

For example, as shown in FIG. 11, a first recessed portion 713 is disposed on a surface of the shielding case 71. The capillary grooves 721 are disposed on a bottom wall of the first recessed portion 713. The thermally conductive plate 73 includes a second recessed portion 731. The thermally conductive plate 73 is connected to the shielding case 71. The first recessed portion 713, the capillary grooves 721, and the second recessed portion 731 communicate with each other. The sealing cavity 701 includes the first recessed portion 713, the capillary grooves 721, and the second recessed portion 731.

For example, a stamping process may be used to form the second recessed portion 731 on the thermally conductive plate 73. Specifically, a compressive stress is applied to a predetermined region of the thermally conductive plate 73, so that the predetermined region protrudes towards an outer side of the thermally conductive plate 73 to form the second recessed portion 731. Alternatively, an etching process may be used to process and form the second recessed portion 731 on the thermally conductive plate 73. Thinning processing is performed on a predetermined region of the thermally conductive plate 73 by using the etching process, to reduce a thickness of the predetermined region and form the second recessed portion 731.

In some other examples, roughening processing is performed on a surface of the shielding case 71 that faces the sealing cavity 701 to form the capillary structure 72. A structure with irregular microporous passages is formed after roughening processing is performed on the surface of the shielding case 71 that faces the sealing cavity 701. For example, a laser etching process or a chemical etching process may be used to perform roughening processing on the surface of the shielding case 71.

Figure 12:
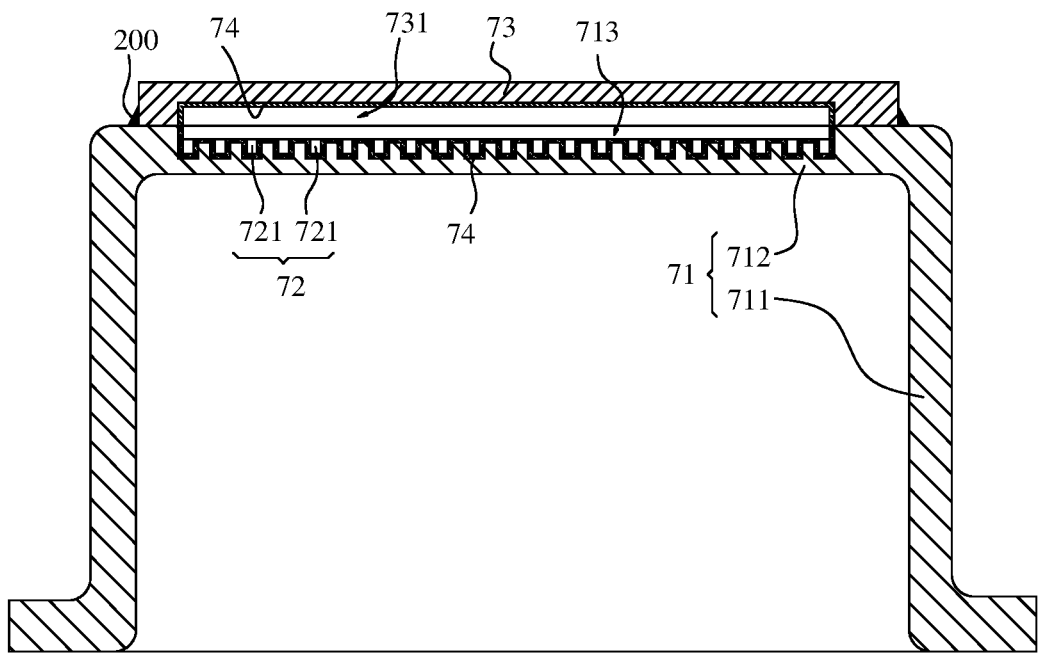
FIG. 12 is a schematic diagram of a structure of a shielding assembly according to another embodiment of this application.

In some implementations, as shown in FIG. 12, a metal material is selected for the shielding case 71. This helps improve the heat dissipation efficiency. A protective layer 74 is disposed on a surface of the shielding case 71 that faces the sealing cavity 701. The protective layer 74 may be configured to isolate the working substance in the sealing cavity 701 and the shielding case 71, so that the working substance is not prone to a chemical reaction caused by contact with the shielding case 71, thereby reducing a possibility that the shielding case 71 is oxidized or corroded by the working substance. For example, a material of the shielding case 71 is any one of steel, titanium, and a titanium alloy. For example, the shielding case 71 may be stainless steel. The shielding case 71 has high yield strength and rigidity. Therefore, the shielding case 71 has a strong anti-deformation capability, and can cope with bending, distortion, a collision, and other circumstances without being easily deformed. This reduces a possibility that a heat dissipation function fails because the shielding case 71 is deformed and pressed against the sealing cavity 701 or the capillary structure 72. A material of the protective layer 74 is copper or a copper alloy. When the working substance is water, as the protective layer 74 does not chemically react with water, the protective layer 74 is not easily oxidized or corroded by the working substance.

For example, the capillary grooves 721 may be formed on the shielding case 71 by using an etching process, and then the protective layer 74 may be formed on the surface of the shielding case 71 that faces the sealing cavity 701 by using an electroplating process or a chemical deposition process.

A metal material is selected for the thermally conductive plate 73. This helps improve the heat dissipation efficiency. A protective layer 74 is disposed on a surface of the thermally conductive plate 73 that faces the sealing cavity 701. The protective layer 74 may be configured to isolate the working substance in the sealing cavity 701 and the thermally conductive plate 73, so that the working substance is not prone to a chemical reaction caused by contact with the thermally conductive plate 73, thereby reducing a possibility that the thermally conductive plate 73 is oxidized or corroded by the working substance. For example, a material of the thermally conductive plate 73 is any one of steel, titanium, and a titanium alloy. For example, the thermally conductive plate 73 may be stainless steel. The thermally conductive plate 73 has high yield strength and rigidity. Therefore, the thermally conductive plate 73 has a strong anti-deformation capability, and can cope with bending, distortion, a collision, and other circumstances without being easily deformed. This reduces a possibility that a heat dissipation function fails because the thermally conductive plate 73 is deformed and pressed against the sealing cavity 701 or the capillary structure 72. A material of the protective layer 74 is copper or a copper alloy. When the working substance is water, as the protective layer 74 does not chemically react with water, the protective layer 74 is not easily oxidized or corroded by the working substance.

It can be understood that, to reduce a possibility that both the shielding case 71 and the thermally conductive plate 73 are oxidized or corroded due to contact with the working substance, the protective layer 74 is disposed on each of the surface of the thermally conductive plate 73 that faces the sealing cavity 701 and the surface of the thermally conductive plate 73 that faces the sealing cavity 701.

The sealing cavity 701 is a vacuum cavity. The working substance in the vaporization zone 701a of the sealing cavity 701 can be vaporized from a liquid phase to form vapor in a vacuum environment. The working substance generates a large amount of latent heat when a phase change phenomenon occurs, and a volume of the working substance rapidly increases in the vacuum environment after the working substance forms the vapor, thereby helping improve the heat dissipation effect. For example, the thermally conductive plate 73 may be connected to the shielding case 71 in a vacuum environment to ensure that the sealing cavity 701 is a vacuum environment. Alternatively, the thermally conductive plate 73 may be connected to the shielding case 71 in a non-vacuum environment, and then the sealing cavity 701 may be vacuumized to form a vacuum environment.

The thermally conductive plate 73 is soldered to and sealed with the shielding case 71, so that strength and stability of the connection between the thermally conductive plate 73 and the shielding case 71 are high, and the thermally conductive plate 73 and the shielding case 71 are not easily separated. This can effectively improve reliability of the sealing between the thermally conductive plate 73 and the shielding case 71. In addition, in a manner of directly soldering the thermally conductive plate 73 to the shielding case 71, it is no longer necessary to connect the thermally conductive plate 73 to the shielding case 71 by using an additional connector (for example, a fastener or a bonding member). This helps simplify a heat exchange structure formed by the thermally conductive plate 73 and the shielding case 71, reduces an overall volume of the heat exchange structure, and therefore reduces a thickness of the heat exchange structure. An edge region of the thermally conductive plate 73 may be soldered to the shielding case 71 to form an annular solder mark 200. The sealing cavity 701 is located in a region defined by the annular solder mark 200. For example, a material of the shielding case 71 is the same as that of the thermally conductive plate 73. For example, the material of the shielding case 71 and that of the thermally conductive plate 73 are both stainless steel or titanium. The thermally conductive plate 73 may be connected to the shielding case 71 by soldering and brazing or a laser soldering process.

In some examples, solder paste is disposed in advance between an edge of the thermally conductive plate 73 and the shielding case 71. The solder paste is heated by using a soldering and brazing process. Molten solder paste forms a solder mark 200 after being cured. A cavity is formed between the thermally conductive plate 73 and the shielding case 71. A pipe is provided to communicate with the cavity, the working substance is injected into the cavity through the pipe, and then the cavity is vacuumized through the pipe. After the vacuumization is completed, the pipe is sealed, and the sealing cavity 701 with the working substance is formed between the thermally conductive plate 73 and the shielding case 71. Finally, an air-tightness check is performed on the sealing cavity 701.

In some implementations, as shown in FIG. 12, the shielding case 71 includes a side plate 711 and a top plate 712. The side plate 711 and the top plate 712 of the shielding case 71 intersect each other, with a predetermined included angle in between. For example, the included angle between the side plate 711 and the top plate 712 may be 90°. An arc transition segment may alternatively be provided between the side plate 711 and the top plate 712 to reduce stress concentration between the side plate 711 and the top plate 712. The side plate 711 of the shielding case 71 is connected to the mainboard 40. For example, the side plate 711 of the shielding case 71 is connected to the mainboard 40 by soldering. The top plate 712 of the shielding case 71 is connected to the thermally conductive plate 73 to form the sealing cavity 701. The electronic components 50 are connected to the top plate 712 of the shielding case 71, and can exchange heat with the top plate 712 of the shielding case 71.

In some examples, a blank for processing and manufacturing the shielding case 71 is a flat sheet. A region of the blank for forming the top plate 712 of the shielding case 71 is first directly processed to form the capillary structure 72. Then, the blank is stamped by using a stamping process, so that the blank undergoes predetermined deformation to form the shielding case 71 with the side plate 711 and the top plate 712. Because a thickness of the blank is small, the shielding case 71 formed by stamping needs to undergo shaping processing, to release internal stress that is accumulated in the shielding case 71 after the stamping. This reduces a possibility that the capillary structure 72 is pressed and deformed and fails because the shielding case 71 is deformed and distorted due to its own excessive internal stress. In an ambient temperature environment, a shaping device is used to push the side plate 711 from an outer side of the side plate 711 to shape the side plate 711, so that the side plate 711 sufficiently releases the internal stress, thereby ensuring that the included angle between the side plate 711 and the top plate 712 is a predetermined angle when the side plate 711 has no internal stress.

In some other examples, a blank for processing and manufacturing the shielding case 71 is a flat sheet. The blank is first stamped by using a stamping process, to obtain the shielding case 71 with the side plate 711 and the top plate 712. Shaping processing is performed on the shielding case 71 to sufficiently release internal stress of the shielding case 71. In an ambient temperature environment, a shaping device is used to push the side plate 711 from an outer side of the side plate 711 to shape the side plate 711, so that the side plate 711 sufficiently releases the internal stress, thereby ensuring that the included angle between the side plate 711 and the top plate 712 is a predetermined angle when the side plate 711 has no internal stress. Finally, the capillary structure 72 is directly processed and formed on the top plate 712 of the shielding case 71 that has undergone shaping. This reduces a possibility that the capillary structure 72 is pressed and deformed and fails because the shielding case 71 is deformed and distorted due to its own excessive internal stress.

For example, the blank may be any one of steel, titanium, and a titanium alloy. Therefore, the blank has high yield strength and rigidity, so that the shielding case 71 formed by using the stamping process has small internal stress, and is not prone to deformation and distortion.

Figure 13:
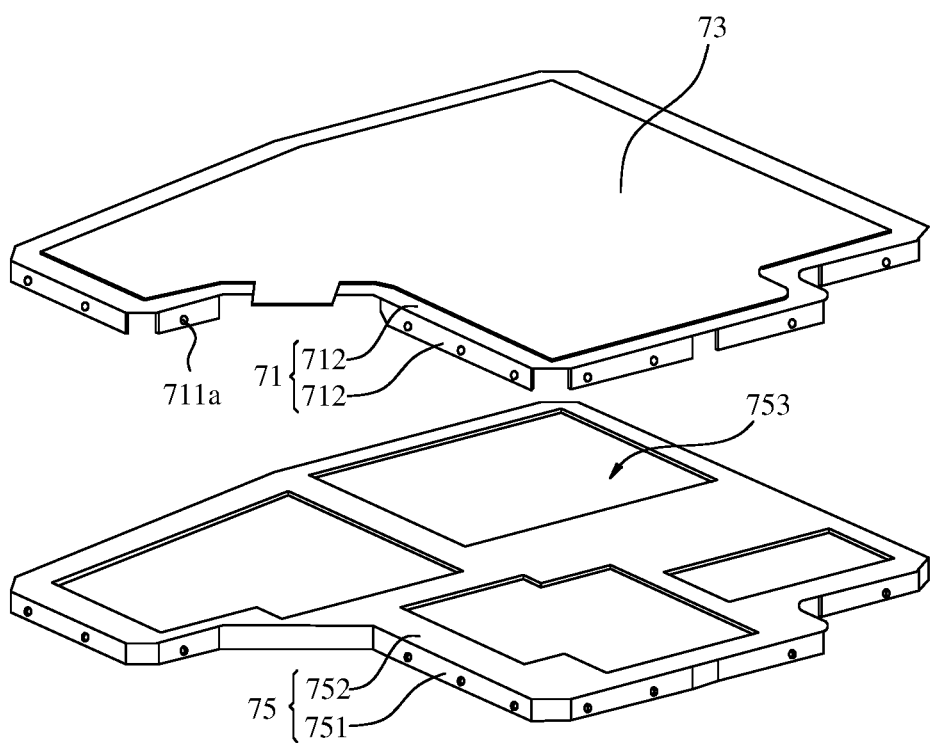
FIG. 13 is a schematic diagram of a breakdown structure of a shielding assembly according to an embodiment of this application.
Figure 14:
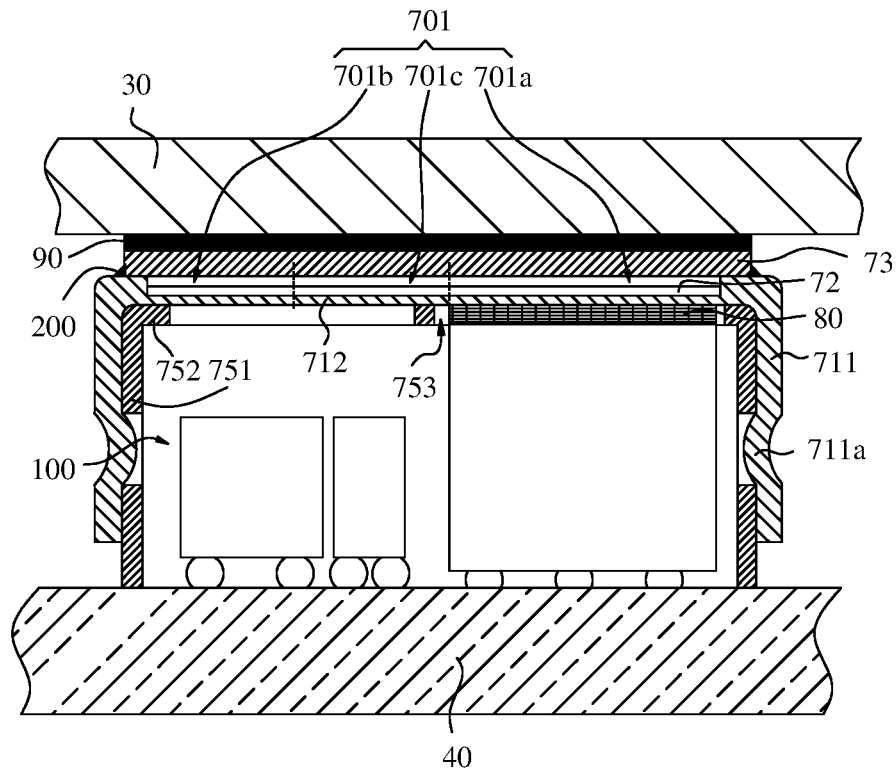
FIG. 14 is a schematic diagram of a partial cross-sectional structure of an electronic device according to yet another embodiment of this application.

In some implementations, as shown in FIG. 13 and FIG. 14, the shielding assembly 70 further includes a shielding frame 75. The shielding frame 75 is connected to the mainboard 40. The shielding case 71 is connected to the shielding frame 75. The shielding case 71 is connected to the mainboard 40 by using the shielding frame 75. The shielding case 71 and the shielding frame 75 are both metal materials. For example, both the shielding case 71 and the shielding frame 75 are steel, for example, stainless steel. The shielding case 71 is detachably connected to the shielding frame 75 to improve detection or maintenance convenience of the electronic components 50. The shielding case 71 is removed from the shielding frame 75 when the electronic components 50 in the shielding assembly 70 need to be detected or maintained. After the detection or maintenance is completed, the shielding case 71 is re-mounted on the shielding frame 75. For example, the shielding case 71 may be connected to the shielding frame 75 by using a clamping connection, an adhesive connection, or a fastener connection. The shielding frame 75 may be soldered to the mainboard 40.

Figure 15:
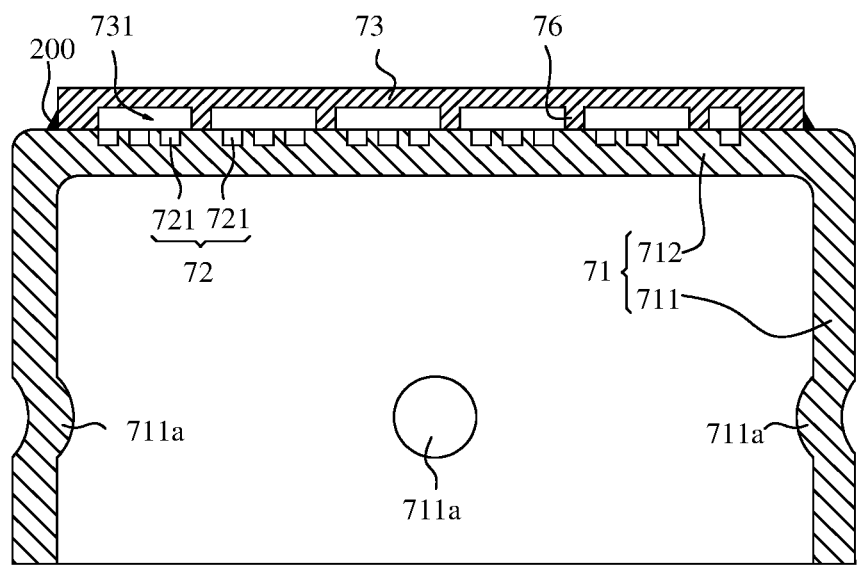
FIG. 15 is a schematic diagram of a structure of a shielding assembly according to another embodiment of this application.

In some examples, the shielding case 71 includes the side plate 711 and the top plate 712. The shielding frame 75 includes a side portion 751 and a top portion 752. The side portion 751 and the top portion 752 of the shielding frame 75 intersect each other. The top portion 752 of the shielding frame 75 has an avoidance hole 753 for avoiding the electronic components 50. The electronic components 50 can be detected or maintained through the avoidance hole 753. A shape of the avoidance hole 753 may match an overall shape of the electronic components 50, or the avoidance hole 753 has a regular shape and has an area greater than an orthographic projection area of the electronic components 50. For example, as shown in FIG. 14 and FIG. 15, the side plate 711 of the shielding case 71 is clamped to the side portion 751 of the shielding frame 75. The side plate 711 of the shielding case 71 has a protrusion 711a, and the side portion 751 of the shielding frame 75 has a clamping hole or a clamping recession for clamping to the protrusion 711a of the side plate 711. The top plate 712 of the shielding case 71 is covered on the avoidance hole 753 disposed on the top portion 752 of the shielding frame 75. A region of the shielding case 71 that corresponds to the avoidance hole 753 is connected to the electronic components 50.

In some implementations, as shown in FIG. 14, the electronic device 10 further includes a first thermally conductive member 80 and a second thermally conductive member 90. The first thermally conductive member 80 is located in the shielding case 71. The first thermally conductive member 80 is disposed between the electronic components 50 and the shielding case 71. The first thermally conductive member 80 can fill a gap between the electronic components 50 and the shielding case 71. This helps reduce thermal resistance between the electronic components 50 and the shielding case 71, and improve heat conduction efficiency between the electronic components 50 and the shielding case 71. A surface of the first thermally conductive member 80 that faces the electronic components 50 is in contact with a surface of the electronic components 50 that faces the shielding case 71. A surface of the first thermally conductive member 80 that faces the shielding case 71 is in contact with a surface of the shielding case 71 that faces the electronic components 50. The first thermally conductive member 80 may be covered on the entire surface of the electronic components 50 that faces the shielding case 71. The first thermally conductive member 80 is disposed corresponding to the vaporization zone 701a of the sealing cavity 701, so that heat conducted by the first thermally conductive member 80 to the shielding case 71 quickly heats up the working substance in the vaporization zone 701a and vaporizes the working substance.

The first thermally conductive member 80 is elastic. The first thermally conductive member 80 can be easily compressed and deformed when subjected to an external force. The electronic components 50 and the shielding case 71 may jointly apply a compressive stress to the first thermally conductive member 80, so that the first thermally conductive member 80 is deformed. In this way, the first thermally conductive member 80 can better fit with the electronic components 50 and the shielding case 71, and reduce a possibility that heat conduction efficiency is affected due to increased thermal resistance caused by existence of a gap between the first thermally conductive member 80 and the electronic components 50 or a gap between the first thermally conductive member 80 and the shielding case 71. For example, the first thermally conductive member 80 may be thermally conductive adhesive. For example, adhesive with good thermal conductivity may be coated on the electronic components 50 in advance, and then the shielding case 71 may be covered on the electronic components 50 and attached to the adhesive. After the adhesive is solidified, the first thermally conductive member 80 can be formed.

The electronic device 10 includes a housing 30. The thermally conductive plate 73 is connected to the housing 30 to perform heat exchange with the housing 30. Heat is conducted to the housing 30 through the thermally conductive plate 73 and is dissipated to the outside of the electronic device 10 through the housing 30. The housing 30 of the electronic device 10 may include a middle frame. The thermally conductive plate 73 is connected to the middle frame. The housing 30 of the electronic device 10 may also include a battery cover. The thermally conductive plate 73 is connected to the battery cover.

A second thermally conductive member 90 is disposed between the thermally conductive plate 73 and the housing 30. The second thermally conductive member 90 can fill a gap between the shielding case 71 and the housing 30. This helps reduce thermal resistance between the shielding case 71 and the housing 30 and improve heat conduction efficiency between the shielding case 71 and the housing 30. An area of the second thermally conductive member 90 is greater than an area of the first thermally conductive member 80. The second thermally conductive member 90 is covered on a region of the thermally conductive plate 73 that corresponds to the sealing cavity 701, so that heat from different regions of the thermally conductive plate 73 can be conducted to the second thermally conductive member 90 and to the housing 30 through the second thermally conductive member 90. Heat generated at the electronic components 50 is conducted through the first thermally conductive member 80 to a region of the shielding case 71 that corresponds to the vaporization zone 701a of the sealing cavity 701. The working substance in the vaporization zone 701a absorbs heat, is vaporized, and then flows to the condensation zone 701b away from the vaporization zone 701a. The working substance can quickly conduct the heat to the shielding case 71 and the thermally conductive plate 73 that are away from the vaporization zone 701a to reduce a possibility of heat gathering in the vaporization zone 701a. The heat of the thermally conductive plate 73 is conducted to the second thermally conductive member 90, and then to the housing 30 through the second thermally conductive member 90. The heat at the first thermally conductive member 80 may rapidly diffuse to the shielding assembly 70 and the second thermally conductive member 90, so that the heat dissipation area is increased and the heat dissipation efficiency is improved.

The second thermally conductive member 90 is elastic. The second thermally conductive member 90 can be easily compressed and deformed when subjected to an external force. The thermally conductive plate 73 and the housing 30 may jointly apply a compressive stress to the second thermally conductive member 90, so that the second thermally conductive member 90 is deformed. In this way, the second thermally conductive member 90 can better fit with the thermally conductive plate 73 and the housing 30, and reduce a possibility that the heat conduction efficiency is affected due to increased thermal resistance caused by existence of a gap between the second thermally conductive member 90 and the shielding case 71 or a gap between the second thermally conductive member 90 and the housing 30. For example, the second thermally conductive member 90 may be thermally conductive adhesive. For example, adhesive with good thermal conductivity may be coated on the thermally conductive plate 73 in advance, and then the housing 30 may be attached to the adhesive. After the adhesive is solidified, the second thermally conductive member 90 can be formed. For example, the second thermally conductive member 90 may be a graphite sheet. A processed graphite sheet is attached to the thermally conductive plate 73 and the housing 30. A graphite sheet has properties of low thermal resistance, a light weight, and high thermal conductivity, and therefore features high heat dissipation efficiency.

Figure 16:
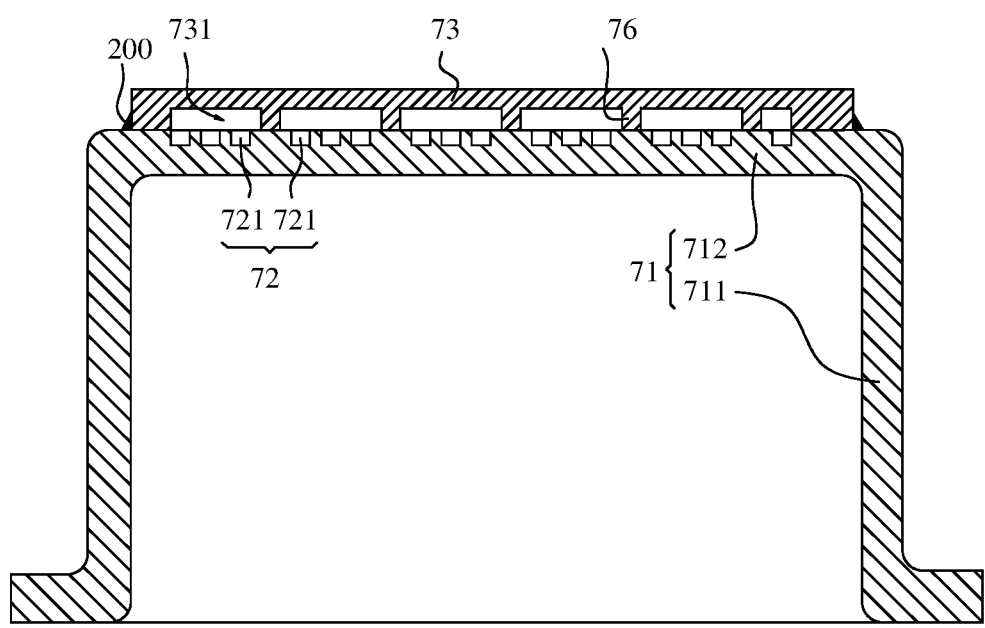
FIG. 16 is a schematic diagram of a structure of a shielding assembly according to still another embodiment of this application.

As the thickness of the thermally conductive plate 73 is small, it can be ensured that the thermally conductive plate 73 has good heat conduction performance. However, the thermally conductive plate 73 with the small thickness tends to be deformed when subjected to an external force. If the thermally conductive plate 73 collapses and is deformed, a collapsed portion of the thermally conductive plate 73 compresses the sealing cavity 701. This causes the sealing cavity 701 to shrink, affects fluidity of the working substance in normal circulation, and reduces the heat conduction efficiency. In addition, there is a possibility that the collapsed portion of the thermally conductive plate 73 is pressed against the capillary structure 72 and the capillary structure 72 is damaged and fails. As shown in FIG. 15 and FIG. 16, the shielding assembly 70 further includes a support column 76. The support column 76 is located in the sealing cavity 701. One end of the support column 76 is connected to the shielding case 71, and the other end is connected to the thermally conductive plate 73. In this way, the support column 76 can provide a support force to the thermally conductive plate 73, to reduce a possibility of collapse and deformation of the thermally conductive plate 73 towards the shielding case 71 due to lack of support from below, so that a surface of the thermally conductive plate 73 that faces away from the shielding case 71 may be in a flat state. The capillary structure 72 in the sealing cavity 701 is disposed avoiding the support column 76.

In some examples, the shielding case 71, the support column 76, and the thermally conductive plate 73 are connected by assembly. One end of the support column 76 is attached to the shielding case 71, and then the thermally conductive plate 73 is clamped to the shielding case 71, so that the other end of the support column 76 is attached to the thermally conductive plate 73.

In some examples, the support column 76 and the thermally conductive plate 73 are an integrally formed structure. The support column 76 is directly processed and formed on the thermally conductive plate 73, to ensure high strength of the connection between the thermally conductive plate 73 and the support column 76, and reduce a possibility that the support column 76 is detached from the thermally conductive plate 73 due to an external force or that the support column 76 is bent and loses a support function due to an external force. For example, the thermally conductive plate 73 and the support column 76 may be formed in a mold casting manner. Alternatively, an etching process may be used to perform etching processing on a blank, to thin regions of the blank that face the sealing cavity 701 to form both the thermally conductive plate 73 and the support column 76. A thinned region forms the second recessed portion 731 of the thermally conductive plate 73. After the thermally conductive plate 73 is connected to the shielding case 71, one end of the support column 76 that is away from the thermally conductive plate 73 is connected to the shielding case 71, and the second recessed portion 731 of the thermally conductive plate 73 forms a part of the sealing cavity 701.

Figure 17:
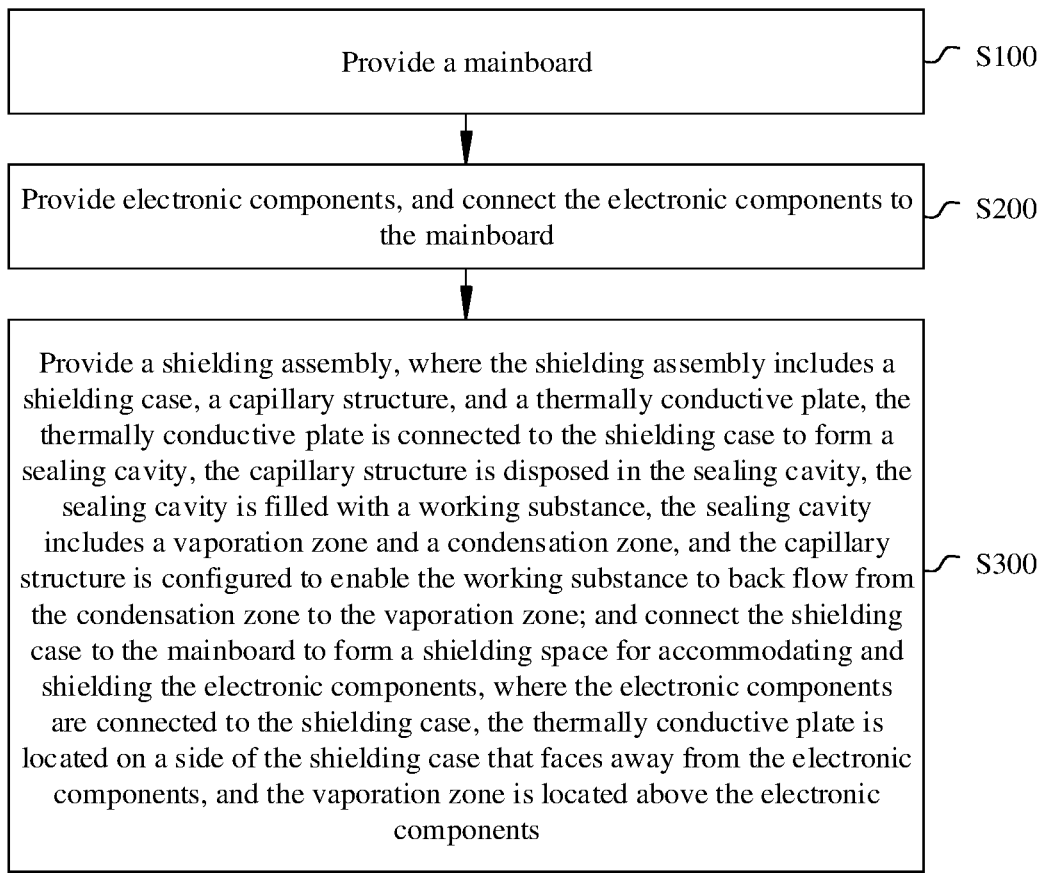
FIG. 17 is a flowchart of a manufacturing method for an electronic device according to an embodiment of this application.

FIG. 17 schematically shows a flowchart of a manufacturing method for an electronic device 10. As shown in FIG. 17, an embodiment of this application provides a manufacturing method for an electronic device 10, including the following steps.

Step S100: Provide a mainboard 40.

Step S200: Provide electronic components 50, and connect the electronic components 50 to the mainboard 40.

Step S300: Provide a shielding assembly 70, where the shielding assembly 70 includes a shielding case 71, a capillary structure 72, and a thermally conductive plate 73, the thermally conductive plate 73 is connected to the shielding case 71 to form a sealing cavity 701, the capillary structure 72 is disposed in the sealing cavity 701, the sealing cavity 701 is filled with a working substance, the sealing cavity 701 includes a vaporization zone 701a and a condensation zone 701b, and the capillary structure 72 is configured to enable the working substance to back flow from the condensation zone 701b to the vaporization zone 701a; and connect the shielding case 71 to the mainboard 40 to form a shielding space for accommodating and shielding the electronic components 50, where the electronic components 50 are connected to the shielding case 71, the thermally conductive plate 73 is located on a side of the shielding case 71 that faces away from the electronic components 50, and the vaporization zone 701a is located above the electronic components 50.

In the electronic device 10 manufactured by using the manufacturing method for the electronic device 10 in this embodiment of this application, the capillary structure 72 is disposed between the shielding case 71 and the thermally conductive plate 73 of the shielding assembly 70. The working substance filled in the sealing cavity 701 may circulate between the vaporization zone 701a and the condensation zone 701b for heat exchange, so that heat at the electronic components 50 may be conducted to a region of the shielding assembly 70 that is away from the electronic components 50. The shielding assembly 70 in this embodiment of this application can increase a heat dissipation area and a heat dissipation rate, thereby improving heat dissipation efficiency, implementing rapid cooling of the electronic components 50, and improving a heat dissipation effect.

In some implementations, in the step of providing the shielding assembly 70: the capillary structure 72 is processed and formed in a region of the shielding case 71 that faces away the electronic components 50. The capillary structure 72 and the shielding case 71 are an integrally formed structure. In a manner of directly forming the capillary structure 72 on the shielding case 71, it is unnecessary to connect the capillary structure 72 to the shielding case 71 by using an assembly operation such as sintering. This helps reduce operations for assembling and connecting the shielding case 71 and the additionally disposed capillary structure 72. In addition, if the shielding case 71 is connected to the capillary structure 72 by assembly, there is a possibility that the capillary structure 72 and the shielding case 71 are separated or misaligned when the capillary structure 72 is subjected to an external force, and the possibility of the foregoing problem can be reduced by directly forming the capillary structure 72 on the shielding case 71 in this application.

In some examples, capillary grooves 721 are processed and formed in the region of the shielding case 71 that faces away the electronic components 50, and the capillary grooves 721 form the capillary structure 72.

In some examples, an etching process is used to form the capillary grooves 721 on a surface of the shielding case 71 that faces the sealing cavity 701.

In some implementations, in the step of providing the shielding assembly 70: a first recessed portion 713 is processed and formed on a surface of the shielding case 71 that faces the thermally conductive plate 73, the sealing cavity 701 includes the first recessed portion 713, and the capillary structure 72 is disposed in the first recessed portion 713.

In some examples, at least a portion of the thermally conductive plate 73 is located in the first recessed portion 713. With at least a portion of the thermally conductive plate 73 located in the first recessed portion 713, a total thickness of the shielding case 71 and the thermally conductive plate 73 is reduced. This makes the shielding assembly 70 have a more compact structure, and reduces space occupancy of the shielding assembly 70. In addition, as at least a portion of the thermally conductive plate 73 is accommodated in the first recessed portion 713, the shielding case 71 can provide protection on the portion of the thermally conductive plate 73 that is accommodated in the first recessed portion 713, so that the portion of the thermally conductive plate 73 is not easily broken or deformed due to a collision against an external structural member.

In some implementations, in the step of providing the shielding assembly 70: a protective layer 74 is disposed on at least one of the surface of the shielding case 71 that faces the sealing cavity 701 and a surface of the thermally conductive plate 73 that faces the sealing cavity 701. The protective layer 74 may be configured to isolate the working substance in the sealing cavity 701 and the thermally conductive plate 73, so that the working substance is not prone to a chemical reaction caused by contact with the thermally conductive plate 73, thereby reducing a possibility that the thermally conductive plate 73 is oxidized or corroded by the working substance.

In some examples, a material of the shielding case 71 is any one of steel, titanium, and a titanium alloy, a material of the thermally conductive plate 73 is any one of steel, titanium, and a titanium alloy, and a material of the protective layer 74 is copper or a copper alloy.

In some implementations, in the step of providing the shielding assembly 70, the shielding case 71 includes a side plate 711 and a top plate 712, the side plate 711 of the shielding case 71 is connected to the mainboard 40, and the top plate 712 of the shielding case 71 is connected to the thermally conductive plate 73 to form the sealing cavity 701.

In some implementations, the sealing cavity 701 is vacuumized. The sealing cavity 701 is a vacuum cavity. The working substance in the vaporization zone 701a of the sealing cavity 701 can be vaporized from a liquid phase to form vapor in a vacuum environment. The working substance generates a large amount of latent heat when a phase change phenomenon occurs, and a volume of the working substance rapidly increases in the vacuum environment after the working substance forms the vapor, thereby helping improve the heat dissipation effect.

In some implementations, in the step of providing the shielding assembly 70, the thermally conductive plate 73 is soldered to and sealed with the shielding case 71 to form the sealing cavity 701. With the thermally conductive plate 73 soldered to and sealed with the shielding case 71, strength and stability of the connection between the thermally conductive plate 73 and the shielding case 71 are high, and the thermally conductive plate 73 and the shielding case 71 are not easily separated. This can effectively improve reliability of the sealing between the thermally conductive plate 73 and the shielding case 71.

In some implementations, in the step of providing the shielding assembly 70, the shielding assembly 70 further includes a shielding frame 75, the shielding frame 75 is connected to the mainboard 40, and the shielding case 71 is connected to the shielding frame 75.

In some examples, the shielding case 71 includes the side plate 711 and the top plate 712. The shielding frame 75 includes a side portion 751 and a top portion 752. The top portion 752 of the shielding frame 75 has an avoidance hole 753 for avoiding the electronic components 50. The side plate 711 of the shielding case 71 is detachably connected to the side portion 751 of the shielding frame 75. The top plate 712 of the shielding case 71 is covered on the avoidance hole 753. The electronic components 50 can be detected or maintained through the avoidance hole 753. The shielding case 71 is detachably connected to the shielding frame 75 to improve detection or maintenance convenience of the electronic components 50.

In some implementations, a housing 30, a first thermally conductive member 80, and a second thermally conductive member 90 are provided. The first thermally conductive member 80 is disposed on the electronic components 50 or the shielding case 71. After the shielding case 71 is connected to the mainboard 40, the first thermally conductive member 80 is disposed between the electronic components 50 and the shielding case 71. The second thermally conductive member 90 is disposed on the thermally conductive plate 73 or the housing 30, and the thermally conductive plate 73 is connected to and the housing 30 by using the second thermally conductive member 90. The first thermally conductive member 80 is disposed between the electronic components 50 and the shielding case 71. The heat at the electronic components 50 may be conducted to the region of the shielding assembly 70 that is away from the electronic components 50, then to the housing 30 through the shielding assembly 70, and ultimately to the outside of the electronic device 10 through the housing 30. The first thermally conductive member 80 can fill a gap between the electronic components 50 and the shielding case 71. This helps reduce thermal resistance between the electronic components 50 and the shielding case 71, and improve heat conduction efficiency between the electronic components 50 and the shielding case 71. A second thermally conductive member 90 is disposed between the thermally conductive plate 73 and the housing 30. The second thermally conductive member 90 can fill a gap between the shielding case 71 and the housing 30. This helps reduce thermal resistance between the shielding case 71 and the housing 30 and improve heat conduction efficiency between the shielding case 71 and the housing 30.

In some examples, both the first thermally conductive member 80 and the second thermally conductive member 90 are elastic. The electronic components 50 and the shielding case 71 may jointly apply a compressive stress to the first thermally conductive member 80, so that the first thermally conductive member 80 is deformed. In this way, the first thermally conductive member 80 can better fit with the electronic components 50 and the shielding case 71, and reduce a possibility that heat conduction efficiency is affected due to increased thermal resistance caused by existence of a gap between the first thermally conductive member 80 and the electronic components 50 or a gap between the first thermally conductive member 80 and the shielding case 71. The thermally conductive plate 73 and the housing 30 may jointly apply a compressive stress to the second thermally conductive member 90, so that the second thermally conductive member 90 is deformed. In this way, the second thermally conductive member 90 can better fit with the thermally conductive plate 73 and the housing 30, and reduce a possibility that the heat conduction efficiency is affected due to increased thermal resistance caused by existence of a gap between the second thermally conductive member 90 and the shielding case 71 or a gap between the second thermally conductive member 90 and the housing 30.

In some examples, the first thermally conductive member 80 is thermally conductive adhesive, and the second thermally conductive member 90 is thermally conductive adhesive or a graphite sheet.

In some implementations, in the step of providing the shielding assembly 70, the shielding assembly 70 further includes a support column 76. The support column 76 is located in the sealing cavity 701. One end of the support column 76 is connected to the shielding case 71 and the other end thereof is connected to the thermally conductive plate 73. The support column 76 can provide a support force to the thermally conductive plate 73, to reduce a possibility of collapse and deformation of the thermally conductive plate 73 towards the shielding case 71 due to lack of support from below, so that a surface of the thermally conductive plate 73 that faces away from the shielding case 71 may be in a flat state.

In some examples, the support column 76 and the thermally conductive plate 73 are an integrally formed structure. The support column 76 is directly processed and formed on the thermally conductive plate 73, to ensure high strength of the connection between the thermally conductive plate 73 and the support column 76, and reduce a possibility that the support column 76 is detached from the thermally conductive plate 73 due to an external force or that the support column 76 is bent and loses a support function due to an external force.

In some implementations, in the step of providing the shielding assembly 70, a second recessed portion 731 is processed and formed on a surface of the thermally conductive plate 73 that faces the shielding case 71, and the support column 76 is located in the second recessed portion 731. The sealing cavity 701 includes the second recessed portion 731.

In the description of the embodiments of this application, it should be noted that, the terms "mounting", "connection", and "connect" should be understood in a broad sense unless otherwise expressly stipulated and limited. For example, "connection" may be a fixed connection, an indirect connection through an intermediate medium, internal communication between two elements, or an interaction relationship between two elements. For a person of ordinary skill in the art, specific meanings of the foregoing terms in the embodiments of this application can be understood based on specific situations.

In the description of the embodiments of this application or imply that an indicated apparatus or element must have a specific direction or must be constructed and operated in a specific direction. Therefore, this cannot be understood as a limitation on the embodiments of this application. In the description of the embodiments of this application, "a plurality of" means two or more, unless otherwise explicitly and specifically specified.

The terms "first", "second", "third", "fourth", and the like (if any) in this specification, the claims, and the accompanying drawings of the embodiments of this application are used to distinguish between similar objects without having to describe a specific order or sequence. It should be understood that, data used in this way may be interchanged under appropriate circumstances, so that the embodiments of this application described herein can be implemented in an order other than that illustrated or described herein. In addition, the terms "including" and "having" and any of their variants are intended to cover non-exclusive inclusions. For example, a process, method, system, product, or device that includes a series of steps or units is not necessarily limited to those steps or units clearly listed, and may include other steps or units that are not clearly listed or are inherent to the process, method, product, or device.

The term "a plurality of" in this specification refers to two or more. The term "and/or" in this specification describes only an association relationship for describing associated objects and represents that three relationships can exist. For example, "A and/or B" can represent the following three cases: Only A exists, both A and B exist, and only B exists. In addition, the character "/" in this specification generally indicates an "or" relationship between the associated objects. In a formula, the character "/" indicates that the associated objects are in a "division" relationship.

It can be understood that, in the embodiments of this application, various numeric numbers are distinguished merely for ease of description and are not used to limit the scope of the embodiments of this application, It can be understood that, in the embodiments of this application, a sequence number of each of the foregoing processes does not mean a sequence of execution. The sequence of execution of the processes should be determined based on functions and internal logic of the processes, and no limitation should be imposed on an implementation process of the embodiments of this application.

What is claimed is:

1. An electronic device, comprising at least the following:
    a mainboard;
    electronic components, disposed on the mainboard; and
    a shielding assembly, comprising a shielding case, a capillary structure, and a thermally conductive plate, wherein the electronic components are located in the shielding case and connected to the shielding case, the mainboard is connected to the shielding case to form a shielding space for shielding the electronic components, the thermally conductive plate is located on a side of the shielding case that faces away from the electronic components, the thermally conductive plate is connected to the shielding case to form a sealing cavity, the capillary structure is disposed in the sealing cavity, the sealing cavity is filled with a working substance, the sealing cavity comprises a vaporization zone and a condensation zone, the vaporization zone is located above the electronic components, and the capillary structure is configured to enable the working substance to back flow from the condensation zone to the vaporization zone,
    wherein the electronic device further comprises a housing, the thermally conductive plate is connected to the housing, the electronic device further comprises a first thermally conductive member and a second thermally conductive member, the first thermally conductive member is disposed between the electronic components and the shielding case, and the second thermally conductive member is disposed between the thermally conductive plate and the housing,
    wherein both the first thermally conductive member and the second thermally conductive member are elastic,
    wherein a plurality of capillary grooves extend in a surface of the shielding case that faces the sealing cavity, and the plurality of capillary grooves form the capillary structure, and
    wherein the shielding assembly further comprises a plurality of support columns, the plurality of support columns is located in the sealing cavity, one end of each support column is connected to the shielding case, and another end of each support column is connected to the thermally conductive plate, and wherein the plurality of capillary grooves are arranged in a manner that avoids overlapping with the plurality of support columns.

2. The electronic device according to claim 1, wherein the capillary structure and the shielding case are an integrally formed structure.

3. The electronic device according to claim 1, wherein a first recessed portion is disposed on a surface of the shielding case that faces the thermally conductive plate, the sealing cavity comprises the first recessed portion, and the capillary structure is disposed in the first recessed portion.

4. The electronic device according to claim 1, wherein a protective layer is disposed on at least one surface of the shielding case that faces the sealing cavity and a surface of the thermally conductive plate that faces the sealing cavity.

5. The electronic device according to claim 4, wherein a material of the shielding case is any one of steel, titanium, and a titanium alloy, a material of the thermally conductive plate is any one of steel, titanium, and a titanium alloy, and a material of the protective layer is copper or a copper alloy.

6. The electronic device according to claim 1, wherein the shielding case comprises a side plate and a top plate, the side plate is connected to the mainboard, and the top plate is connected to the thermally conductive plate to form the sealing cavity.

7. The electronic device according to claim 1, wherein the sealing cavity is a vacuum cavity, or the thermally conductive plate is soldered to and sealed with the shielding case.

8. The electronic device according to claim 1, wherein the shielding assembly further comprises a shielding frame, the shielding frame is connected to the mainboard, and the shielding case is connected to the shielding frame.

9. The electronic device according to claim 8, wherein the shielding case comprises a side plate and a top plate, the shielding frame comprises a side portion and a top portion, the top portion has an avoidance hole for avoiding the electronic components, the side plate is detachably connected to the side portion, and the top plate is covered on the avoidance hole.

10. The electronic device according to claim 1, wherein the first thermally conductive member is a thermally conductive adhesive, and the second thermally conductive member is a thermally conductive adhesive or a graphite sheet.

11. The electronic device according to claim 1, wherein the plurality of support columns and the thermally conductive plate are an integrally formed structure.

12. The electronic device according to claim 1, wherein the thermally conductive plate has a second recessed portion, the plurality of support columns is located in the second recessed portion, and the sealing cavity comprises the second recessed portion.

13. The electronic device according to claim 1, wherein the working substance is water.

14. A heat dissipation system for electronic components, comprising:
- a mainboard having the electronic components mounted thereon;
- a shielding apparatus comprising:
  - a shielding housing connected to the mainboard to form a shielding chamber that encloses the electronic components, wherein the electronic components are in thermal contact with the shielding housing;
  - a conductive cover positioned on a side of the shielding housing opposite to the electronic components, the conductive cover connected to the shielding housing to define an enclosed sealed space;
  - a capillary structure disposed within the enclosed sealed space;
  - a working fluid filling the enclosed sealed space, wherein the enclosed sealed space includes an evaporation region positioned above the electronic components and a condensation region; and
  - wherein the capillary structure is configured to transport the working fluid from the condensation region to the evaporation region;
- a device enclosure connected to the conductive cover;
- a first thermal interface material positioned between the electronic components and the shielding housing, the first thermal interface material having elastic properties; and
- a second thermal interface material positioned between the conductive cover and the device enclosure, the second thermal interface material having elastic properties,
- wherein a plurality of capillary grooves extend in a surface of the shielding housing that faces the enclosed sealed space, and the plurality of capillary grooves forms the capillary structure, and
- wherein the shielding apparatus further comprises a plurality of support columns, the plurality of support columns is located in the enclosed sealed space, one end of each support column is connected to the shielding housing, and another end of each support column is connected to the conductive cover, and wherein the plurality of capillary grooves are arranged in a manner that avoids overlapping with the plurality of support columns.

15. The heat dissipation system of claim 14, wherein the shielding housing includes a recessed area facing the conductive cover, and wherein the enclosed sealed space includes the recessed area.

16. The heat dissipation system of claim 14, further comprising a protective coating applied to at least one surface within the enclosed sealed space, wherein the protective coating comprises copper or a copper alloy.

17. The heat dissipation system of claim 16, wherein the protective coating lines the plurality of capillary grooves.

18. The heat dissipation system of claim 14, wherein the enclosed sealed space is maintained under vacuum conditions.

19. The heat dissipation system of claim 14, wherein a shielding housing groove extends in a surface of the shielding housing to which the conductive cover is attached, and the conductive cover is attached to the shielding housing in the shielding housing groove.

20. The heat dissipation system of claim 14, wherein the working fluid is water.

* * * * *